US006577946B2

(12) United States Patent
Myr

(10) Patent No.: US 6,577,946 B2
(45) Date of Patent: Jun. 10, 2003

(54) TRAFFIC INFORMATION GATHERING VIA CELLULAR PHONE NETWORKS FOR INTELLIGENT TRANSPORTATION SYSTEMS

(75) Inventor: David Myr, Jerusalem (IL)

(73) Assignee: Makor Issues and Rights Ltd., Jerusalem (IL)

( * ) Notice: Subject to any disclaimer, the term of this patent is extended or adjusted under 35 U.S.C. 154(b) by 0 days.

(21) Appl. No.: 09/901,923

(22) Filed: Jul. 10, 2001

(65) Prior Publication Data

US 2003/0014181 A1 Jan. 16, 2003

(51) Int. Cl.[7] .......................... G06F 17/00; G08G 1/00
(52) U.S. Cl. ...................... 701/117; 701/118; 455/456
(58) Field of Search ............................... 701/117, 118, 701/119; 340/905, 934; 455/456, 457, 458, 507, 521

(56) References Cited

U.S. PATENT DOCUMENTS

| | | | | | |
|---|---|---|---|---|---|
| 5,465,289 | A | * | 11/1995 | Kennedy, Jr. | 340/910 |
| 5,465,390 | A | * | 11/1995 | Cohen | 455/423 |
| 5,668,717 | A | | 9/1997 | Spall | 701/117 |
| 5,745,865 | A | * | 4/1998 | Rostoker et al. | 455/456 |
| 5,828,962 | A | * | 10/1998 | Ho-A-Chuck | 455/423 |
| 5,946,612 | A | * | 8/1999 | Johansson | 455/405 |
| 6,012,012 | A | | 1/2000 | Fleck et al. | 701/117 |
| 6,202,024 | B1 | * | 3/2001 | Yokoyama et al. | 701/200 |
| 6,308,071 | B1 | * | 10/2001 | Kalev | 455/425 |
| 6,341,255 | B1 | * | 1/2002 | Lapidot | 340/905 |

* cited by examiner

*Primary Examiner*—Tan Q. Nguyen
(74) *Attorney, Agent, or Firm*—RatnerPrestia

(57) ABSTRACT

A system and method for controlling traffic flow is disclosed. Location information is obtained and continuously updated from vehicular-based cellular phones. This information is processed and used as an input to Intelligent Transportation Systems, in particular to Real Time Urban Traffic Guidance for Vehicular Congestion and Intelligent Traffic Control Systems. Position information records of vehicle based phone coordinates, timing, etc, are collected from the cellular networks, updated and stored in a database. Those records together with digital maps are fed into mathematical models and algorithms to construct lists of vehicles traveling on various road sections, traffic loads at particular road sections, real time travel times along all road sections resulting from traffic congestion in particular areas, turning loads for signal intersections, for ral time functioning of Intelligent Transportation System, in particular of Intelligent Traffic Control Systems, and Route Guidance Systems.

24 Claims, 20 Drawing Sheets

Traffic Information Gathering System via
Cellular Networks for Automated Traffic Signal Control Fig. 1 Traffic Information Gathering System via Cellular Networks for Automated Traffic Signal Control
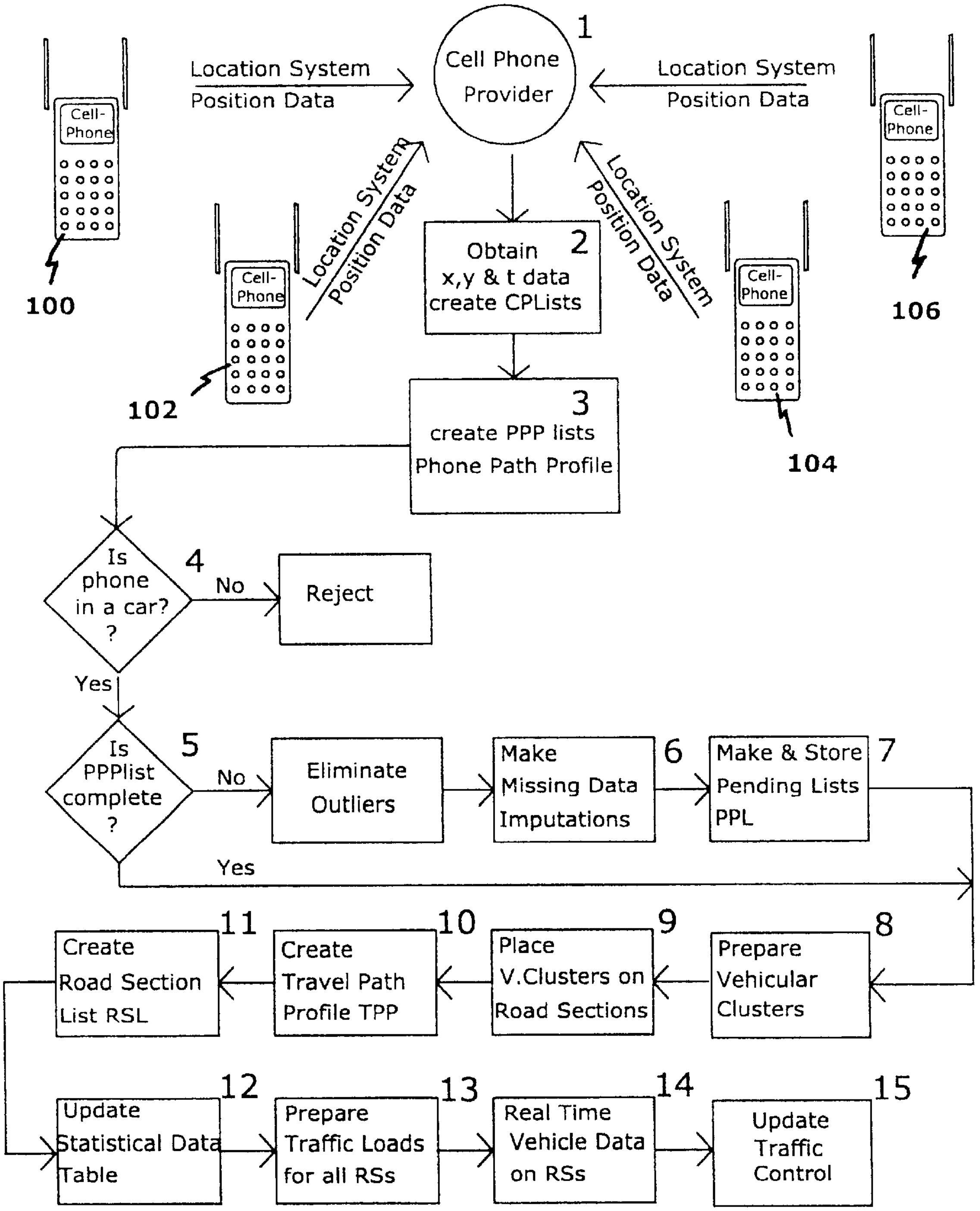

Fig. 2 Creating Current Cell Phone List
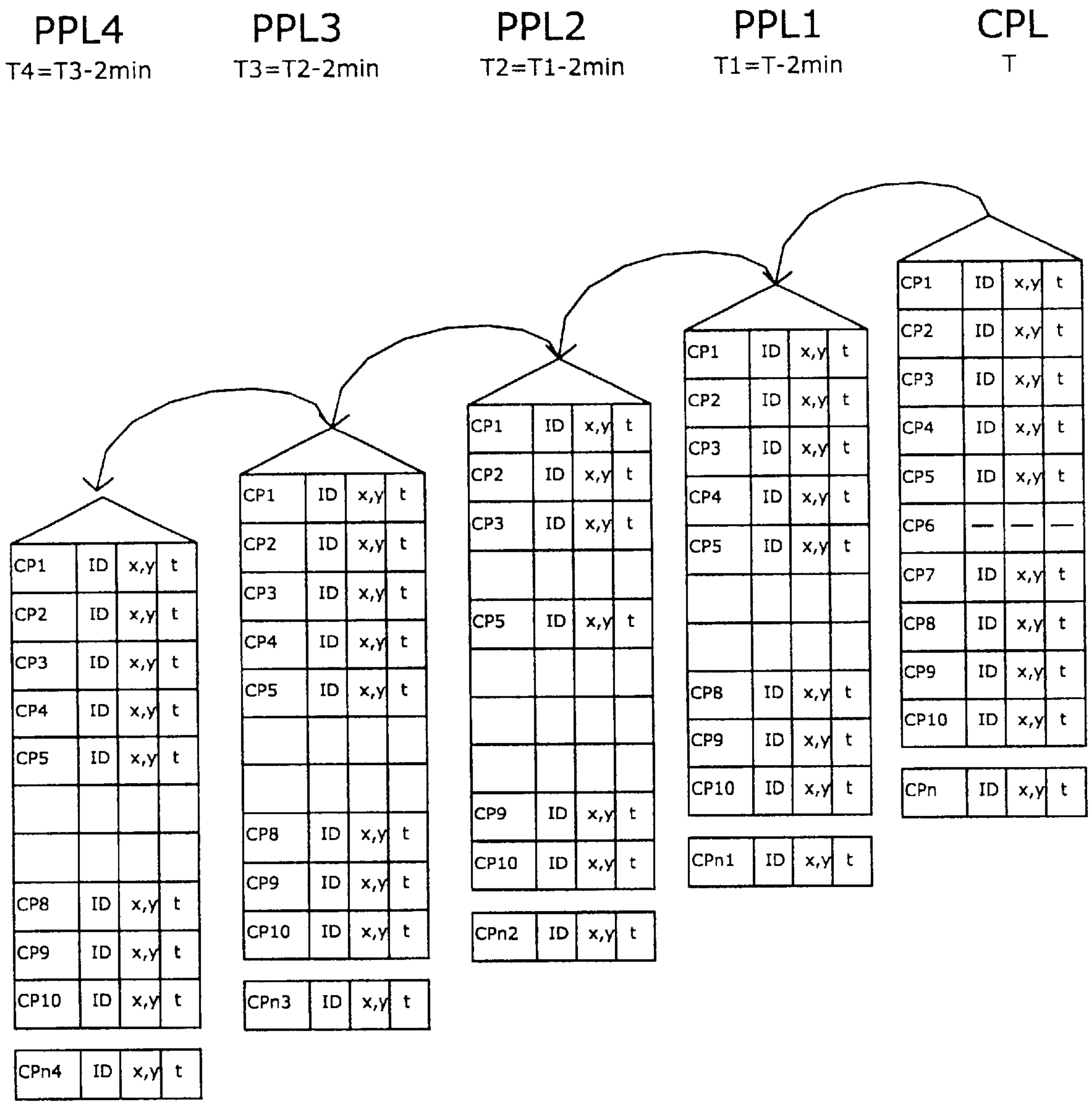

Fig. 3 Creating Cell Phone Path Profile List

PPP Table:

Time Interval

| Active Cell Phones | T P | T1 P1 | T2 P2 | T3 P3 | T4 P4 | SCORE | T5 PEPL |
|---|---|---|---|---|---|---|---|
| CP1 | O | O | O | O | O | ✓ | O |
| CP2 | O | O | O | O | O | ✓ | O |
| CP3 | O | O | | O | O | -1 | O |
| CP4 | O | O | | O | O | -1 | O |
| CP5 | O | | O | O | O | -1 | O |
| CP6 | O | | | | | -4 | |
| CP7 | O | | | O | O | -2 | O |
| CP8 | | O | O | O | O | -1 | O |
| CP9 | | O | O | O | | -2 | O |
| CP10 | O | O | O | | O | -1 | O |
| CPn | O | O | O | O | O | ✓ | O |

PEPL Table:

Time Interval

| Active Cell Phones | T P | T1 P1 | T2 P2 | T3 P3 | T4 P4 | T5 P5 | SCORE |
|---|---|---|---|---|---|---|---|
| CP1 | O | O | O | O | O | O | ✓ |
| CP2 | O | O | O | O | O | O | ✓ |
| CP3 | O | O | | O | O | O | ✓ |
| CP4 | O | O | | O | O | O | ✓ |
| CP5 | O | | O | O | O | | ✓ |
| CP6 | O | | | | | | — |
| CP7 | O | | | O | O | | — |
| CP8 | O | O | O | O | O | | ✓ |
| CP9 | O | O | O | O | O | | ✓ |
| CP10 | O | O | O | | O | O | ✓ |
| CPm | O | O | O | O | O | O | ✓ |

Fig. 4
Initial Discrimination Between Phones In Vehicles And Other Phones

| | Vehicle Positions | | | | Speeds | | |
|---|---|---|---|---|---|---|---|
| | p1 | p2 | p3 | p4 | v2 | v3 | v4 |
| 1 | | | LR | LR | | | |
| 2 | | LR | | LR | | | |
| 3 | LR | | | LR | | | |
| 4 | | LR | LR | | | | |
| 5 | LR | | LR | | | | |
| 6 | LR | LR | | | | | |
| 7 | | | | LR | | | > |
| 8 | | | LR | | | | > |
| 9 | | | LR | | | > | |
| 10 | | LR | | | | > | |
| 11 | | LR | | | > | | |
| 12 | LR | | | | > | | |
| 13 | | SR | SR | SR | | > | > |
| 14 | SR | SR | SR | | > | > | |

Fig. 5 Eliminating Untenable Cell Phone Records (Outliers)
A.
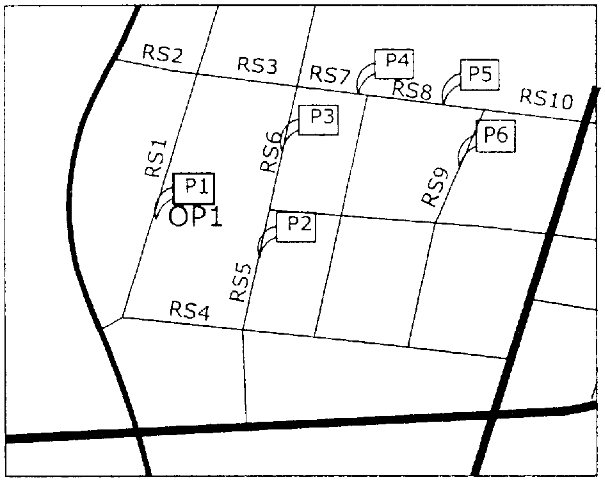
| ΔT | CPL List: P | CPL List: RS | CPL List: SCORE | PPL List: SCORE |
|---|---|---|---|---|
| T1 | P1 | RS1 | OP1 -1 | — |
| T2 | P2 | RS5 | ✓ | ✓ |
| T3 | P3 | RS6 | ✓ | ✓ |
| T4 | P4 | RS7 | ✓ | ✓ |
| T5 | P5 | RS8 | ✓ | ✓ |
| T6 | P6 | RS9 | ✓ | ✓ |
B.
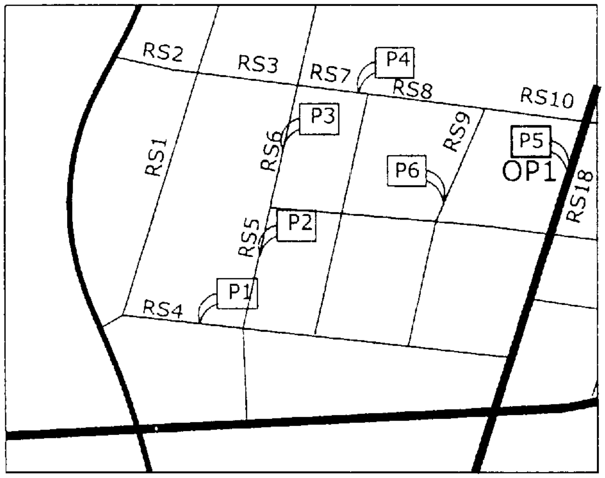
| ΔT | CPL List: P | CPL List: RS | CPL List: SCORE | PPL List: SCORE |
|---|---|---|---|---|
| T1 | P1 | RS4 | ✓ | ✓ |
| T2 | P2 | RS5 | ✓ | ✓ |
| T3 | P3 | RS6 | ✓ | ✓ |
| T4 | P4 | RS7 | ✓ | ✓ |
| T5 | P5 | RS18 | OP1 -1 | — |
| T6 | P6 | RS9 | ✓ | ✓ |

Fig. 6 Missing Data Imputations and Eliminations
C.
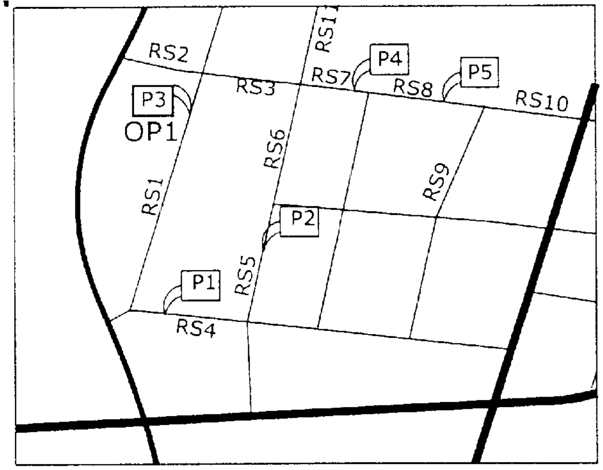
| ΔT | CPL List: P | CPL List: RS | CPL List: SCORE | PPL List: SCORE | Impute List: SCORE |
|---|---|---|---|---|---|
| T1 | P1 | RS4 | ✓ | (✓) | (✓) |
| T2 | P2 | RS5 | ✓ | (✓) | (✓) |
| T3 | P3 | RS1 | OP1 -1 | – | (✓) RS6 |
| T4 | P4 | RS7 | ✓ | (✓) | (✓) |
| T5 | P5 | RS8 | ✓ | (✓) | (✓) |
D.
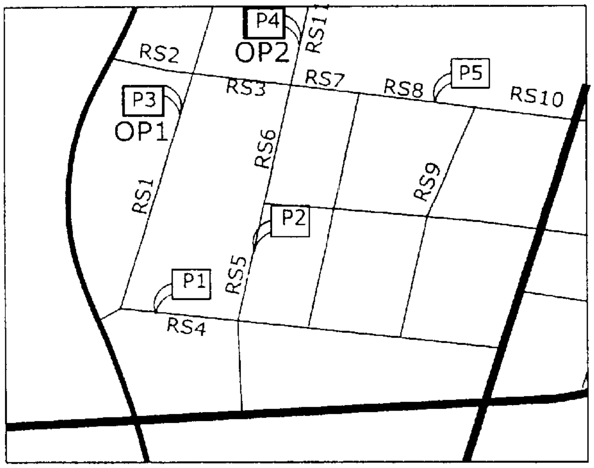
| ΔT | CPL List: P | CPL List: RS | CPL List: SCORE | PPL List: SCORE | Reject List: SCORE |
|---|---|---|---|---|---|
| T1 | P1 | RS4 | ✓ | (✓) | (✓) |
| T2 | P2 | RS5 | ✓ | (✓) | (✓) |
| T3 | P3 | RS1 | OP1 -1 | – | – |
| T4 | P4 | RS7 | OP2 -2 | – | – |
| T5 | P5 | RS8 | ✓ | (✓) | (✓) |
| | | | | | -2 |

Fig. 7 Creating and Storing Pending Phone List

PPP Table: | PEPL Table:

Time Interval

| Active Cell Phones | T | T1 | T2 | T3 | T4 | SCORE | T5 Impute: | T5 PEPL | SCORE | T6 |
|---|---|---|---|---|---|---|---|---|---|---|
| CP1 | x, y | x1, y1 | x2, y2 | x3, y3 | x4, y4 | ✓ | ✓ | x5, y5 | ✓ | |
| CP2 | x, y | x1, y1 | x2, y2 | x3, y3 | x4, y4 | ✓ | ✓ | x5, y5 | ✓ | |
| CP3 | x, y | x1, y1 | | x3, y3 | x4, y4 | -1 | x2, y2 | — | O | x6, y6 |
| CP4 | x, y | x1, y1 | x2, y2 | | x4, y4 | -1 | x3, y3 | — | O | x6, y6 |
| CP5 | x, y | x1, y1 | x2, y2 | x3, y3 | | -1 | x4, y4 | x5, y5 | ✓ | |
| CP6 | x, y | | | | | -4 | — | x5, y5 | — | |
| CP7 | x, y | | | x3, y3 | x4, y4 | -2 | — | x5, y5 | — | |
| CP8 | | x1, y1 | x2, y2 | x3, y3 | x4, y4 | -1 | x, y | — | O | x6, y6 |
| CP9 | | x1, y1 | x2, y2 | x3, y3 | | -2 | — | — | — | |
| CP10 | x, y | | x2, y2 | x3, y3 | x4, y4 | -1 | x1, y1 | x5, y5 | ✓ | |
| CPn | x, y | x1, y1 | x2, y2 | x3, y3 | x4, y4 | ✓ | | x5, y5 | ✓ | |

Type A Error: Two Vehicles Are Clustered Together
Case 1: Large Measurement Error A - Position of first phone
B - True Position of Second Phone
B' - Erroneously Measured Position of Second Phone Type A Error: Two Vehicles Are Clustered Together
Case 2: They Travel Closely Together A - Position of first phone
B - Position of Second Phone Is Too Close to First Phone Type B Error: Two Phones in One Vehicle Are Clustered Into Different Clusters Due To Large Measurement Error A - Position of first phone
B - True Position of Second Phone
B' - Erroneously Measured Position of Second Phone Fig.11 Criteria for Placing Cell Phones in Vehicular Clusters
A.
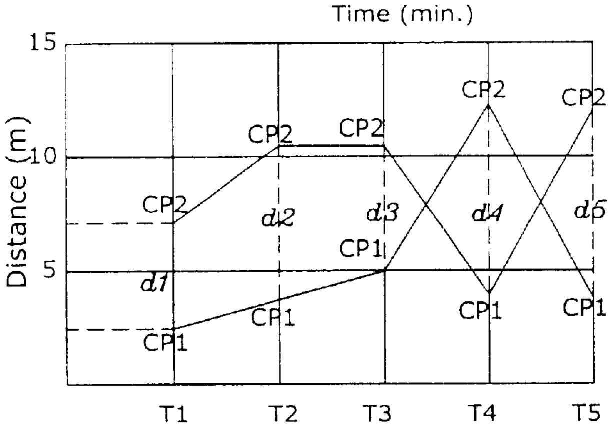
Distance Table for CP1&CP2:
| | d | SCORE |
|---|---|---|
| d1 | 4.9m | ✓ |
| d2 | 6.6m | ✓ |
| d3 | 5.3m | ✓ |
| d4 | 7.8m | ✓ |
| d5 | 8.0m | ✓ |
| AU1 | CP1 CP2 | ✓ |
B.
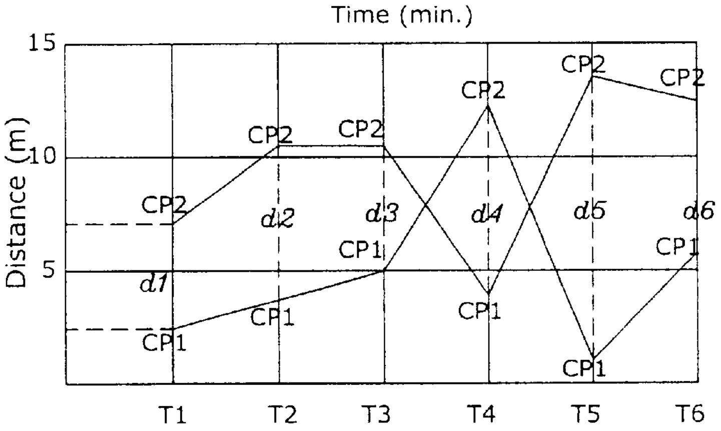
Table for CP1&CP2:
| | d | SCORE |
|---|---|---|
| d1 | 4.9m | ✓ |
| d2 | 6.6m | ✓ |
| d3 | 5.3m | ✓ |
| d4 | 7.8m | ✓ |
| d5 | 12.0m | -1 |
| d6 | 9.0m | ✓ |
| AU1 | CP1 CP2 | ✓ |
C.
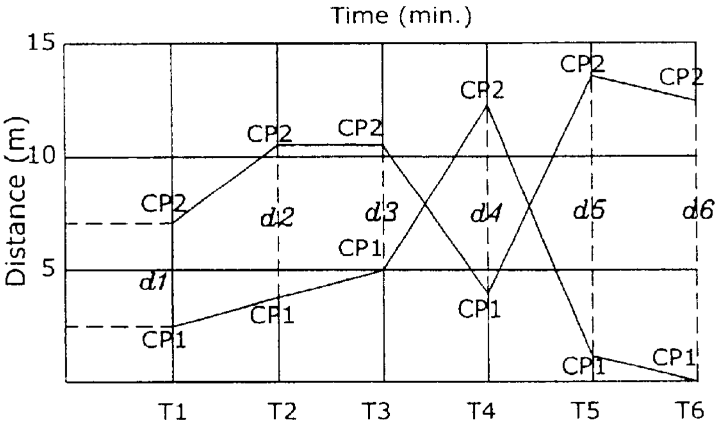
Table for CP1&CP2:
| | d | SCORE |
|---|---|---|
| d1 | 4.9m | ✓ |
| d2 | 6.6m | ✓ |
| d3 | 5.3m | ✓ |
| d4 | 7.8m | ✓ |
| d5 | 12.0m | -1 |
| d6 | 13.0m | -1 |
| | | — |

Fig.12 Grouping Cell Phones in Vehicular Clusters
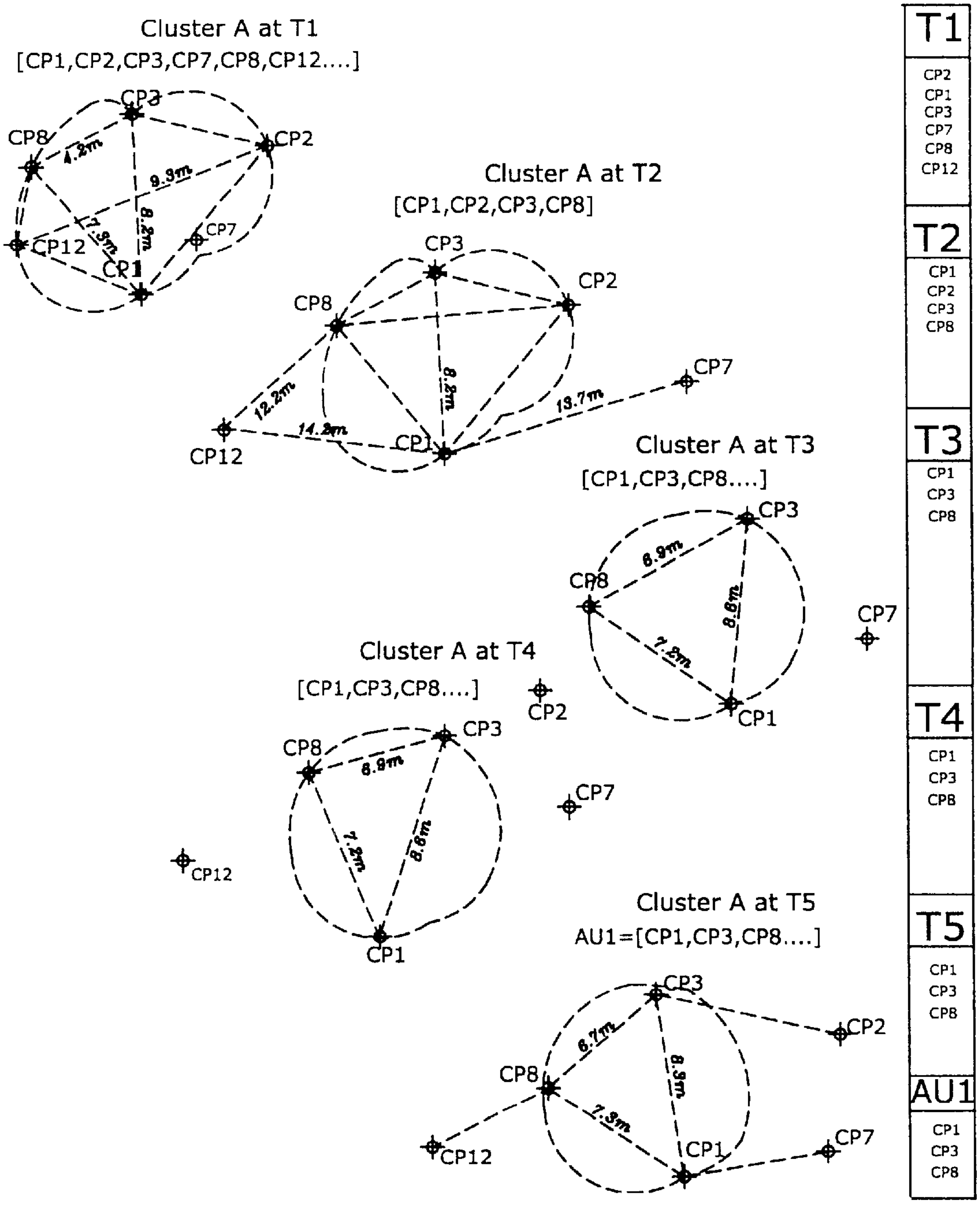

Fig.13 Placing Vehicles on Road Sections

PVL Table:

Time Interval

| Vehicle Identity | T | T1 | T2 | T3 | T4 | SCORE |
|---|---|---|---|---|---|---|
| AU1 | (x,y)t (x,y)t RS 1 | (x1,y1)t (x1,y1)t RS 1 | (x2,y2)t (x2,y2)t RS 6 | (x3,y3)t (x3,y3)t RS 6 | (x4,y4)t (x4,y4)t RS 8 | ✓ |
| AU2 | (x,y)t RS 1 | (x1,y1)t RS 1 | (x2,y2)t — | (x3,y3)t RS 6 | (x4,y4)t RS 8 | -1 |
| AU3 | (x,y)t RS 1 | (x1,y1)t RS 1 | (x2,y2)t RS 9 | (x3,y3)t RS 10 | (x4,y4)t RS 8 | ✓ |
| AU4 | (x,y)t RS 11 | (x1,y1)t RS 11 | (x2,y2)t RS 7 | (x3,y3)t — | (x4,y4)t RS 15 | -1 |
| AU5 | (x,y)t RS 11 | (x1,y1)t RS 16 | — | (x3,y3)t RS 16 | — | -2 |
| AU23 | (x,y)t RS 5 | (x1,y1)t RS 5 | (x2,y2)t RS 9 | (x3,y3)t RS 10 | (x4,y4)t RS 8 | ✓ |
| AU43 | — | (x1,y1)t RS 1 | (x2,y2)t RS 9 | (x3,y3)t RS 10 | — | -2 |
| AU12 | (x,y)t RS 5 | (x1,y1)t RS 25 | (x2,y2)t RS 19 | (x3,y3)t RS 10 | (x4,y4)t RS 8 | ✓ |
| AU13 | — | — | (x2,y2)t RS 9 | (x3,y3)t RS 10 | (x4,y4)t RS 8 | -2 |
| AU42 | (x,y)t RS 69 | (x1,y1)t RS 69 | (x2,y2)t RS 68 | (x3,y3)t RS 68 | (x4,y4)t RS 68 | ✓ |
| AU27 | (x,y)t RS 69 | (x1,y1)t RS 69 | (x2,y2)t RS 69 | (x3,y3)t RS 69 | (x4,y4)t RS 68 | ✓ |
| AU51 | (x,y)t RS 69 | (x1,y1)t RS 69 | (x2,y2)t RS 69 | (x3,y3)t RS 69 | (x4,y4)t — | -1 |
| | | | | | | |
| AU37 | — | (x1,y1)t RS 11 | (x2,y2)t RS 7 | (x3,y3)t RS 16 | (x4,y4)t RS 15 | -1 |
| AU38 | (x,y)t RS 16 | (x1,y1)t RS 16 | — | (x3,y3)t RS 16 | (x4,y4)t — | -2 |
| AU39 | — | (x1,y1)t RS 11 | (x2,y2)t RS 7 | (x3,y3)t RS 10 | (x4,y4)t RS 8 | -1 |
| | | | | | | |

CVL Table:

| Vehicle Identity | T5 | SCORE |
|---|---|---|
| AU1 | (x5,y5)t (x5,y5)t RS 8 | ✓ |
| AU2 | (x5,y5)t RS 8 | ✓ |
| AU3 | (x5,y5)t RS 8 | ✓ |
| AU4 | (x5,y5)t RS 15 | ✓ |
| AU5 | — | -3 |
| AU23 | (x5,y5)t RS 8 | ✓ |
| AU43 | — | -2 |
| AU12 | (x5,y5)t RS 8 | ✓ |
| AU13 | (x5,y5)t RS 8 | -2 |
| AU42 | (x5,y5)t RS 68 | ✓ |
| AU27 | (x5,y5)t RS 68 | ✓ |
| AU51 | (x5,y5)t RS 69 | ✓ |
| | | |
| AU37 | (x5,y5)t RS 15 | ✓ |
| AU38 | (x5,y5)t — | -3 |
| AU39 | (x5,y5)t RS 8 | ✓ |
| | | |

Fig. 14 Method for Updating Entry and Exit Vehicle Lists
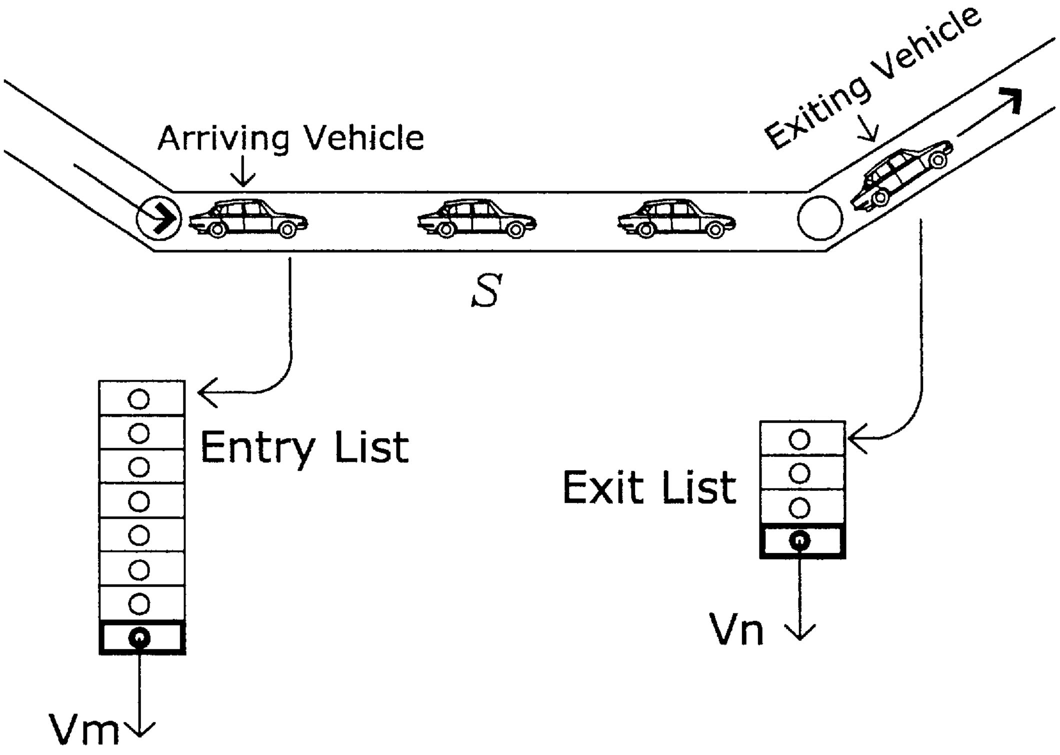

Fig.15 Regression-Based Prediction of Current Travel Times
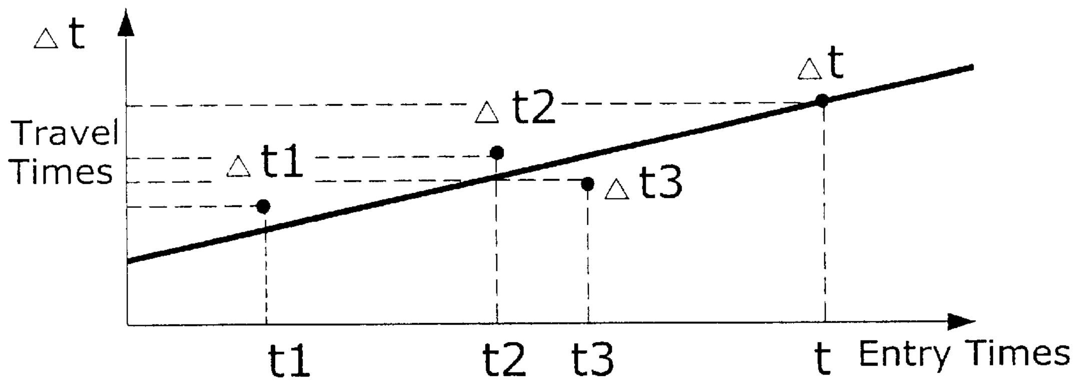

Fig. 16 Statistical Table Based on Real Time Traffic Information

Time Zones

Road ID's

RS1 RS2 RSn

Work/Study Days

| | 00.01-06.00 | 06.01-10.00 | 10.01-15.00 | 15.01-19.00 | 19.01-24.00 |
|---|---|---|---|---|---|
| SUN. | 6 Vh/10min | 15 Vh/10min | 10 Vh/10min | 18 Vh/10min | 5 Vh/10min |
| MON. | 8 Vh/10min | 17 Vh/10min | 10 Vh/10min | 22 Vh/10min | 7 Vh/10min |
| TUES. | 6 Vh/10min | 10 Vh/10min | 17 Vh/10min | 7 Vh/10min | 5 Vh/10min |
| WEDN. | 6 Vh/10min | 10 Vh/10min | 10 Vh/10min | 10 Vh/10min | 5 Vh/10min |
| THUR. | 8 Vh/10min | 17 Vh/10min | 10 Vh/10min | 10 Vh/10min | 5 Vh/10min |
| FRI. | 10 Vh/10min | 22 Vh/10min | 10 Vh/10min | 7 Vh/10min | 5 Vh/10min |
| SAT. | 6 Vh/10min | 6 Vh/10min | 8 Vh/10min | 8 Vh/10min | 5 Vh/10min |

Vehicle Load/ Road Section

Work/No Study Days

| | | | | | |
|---|---|---|---|---|---|
| SUN. | 17 Vh/10min | 10 Vh/10min | 00.01-06.00 | 06.01-10.00 | 10.01-15.00 |
| MON. | 10 Vh/10min | 17 Vh/10min | 6 Vh/10min | 15 Vh/10min | 10 Vh/10min |
| TUES. | 17 Vh/10min | 10 Vh/10min | 8 Vh/10min | 17 Vh/10min | 10 Vh/10min |
| WEDN. | 10 Vh/10min | 17 Vh/10min | 6 Vh/10min | 10 Vh/10min | 17 Vh/10min |
| THUR. | 10 Vh/10min | 10 Vh/10min | 6 Vh/10min | 10 Vh/10min | 10 Vh/10min |
| FRI. | 8 Vh/10min | 17 Vh/10min | 8 Vh/10min | 17 Vh/10min | 10 Vh/10min |
| SAT. | 6 Vh/10min | 10 Vh/10min | 10 Vh/10min | 22 Vh/10min | 10 Vh/10min |

No Work/ Study Days

| | | | | | |
|---|---|---|---|---|---|
| SUN. | 0.2 | 0.2 | 0.5 | 0.2 | 0.7 |
| MON. | 0.5 | 0.2 | 0.5 | 0.2 | 0.5 |
| TUES. | 0.5 | 0.8 | 0.7 | 0.5 | 0.8 |
| WEDN. | 0.8 | 0.5 | 1.8 | 0.8 | 0.5 |
| THUR. | 0.7 | 0.5 | 1.8 | 0.5 | 0.8 |
| FRI. | 0.2 | 0.2 | 0.5 | 0.9 | 0.5 |
| SAT. | 0.2 | 0.5 | 0.7 | 0.5 | 0.2 |

Vehicle Speed Coefficient/ Road Section

No Work/No Study Days

| | | | | | |
|---|---|---|---|---|---|
| SUN. | 0.2 | 0.7 | 0.8 | 0.2 | 0.2 |
| MON. | 0.2 | 0.5 | 0.7 | 0.5 | 0.2 |
| TUES. | 0.5 | 0.8 | 0.2 | 0.5 | 0.8 |
| WEDN. | 0.8 | 0.5 | 0.3 | 0.8 | 0.5 |
| THUR. | 0.5 | 0.5 | 0.8 | 0.7 | 0.5 |
| FRI. | 0.9 | 0.5 | 0.5 | 0.2 | 0.2 |
| SAT. | 0.5 | 0.2 | 0.3 | 0.8 | 0.5 |

Vehicle Speed Coefficient

Fig. 17 Seasonal Statistical Traffic Data Table for All Road Sections

Road ID's: RS1, RS2, RSn

| Month | Time | SAT. | SUN. | MON. | TUES. | WEDN. | THUR. | FRI. |
|---|---|---|---|---|---|---|---|---|
| January | 06.01-10.00 | 0.7 | 0.5 | 1.8 | 0.5 | 0.8 | 0.7 | 0.5 |
| | 10.01-15.00 | 0.2 | 0.2 | 0.5 | 0.9 | 0.5 | 0.2 | 0.2 |
| | 15.01-19.00 | 0.2 | 0.2 | 0.5 | 0.2 | 0.7 | 0.2 | 0.2 |
| | 19.01-24.00 | 0.5 | 0.2 | 0.5 | 0.2 | 0.5 | 0.5 | 0.2 |
| February | 06.01-10.00 | 0.2 | 0.2 | 0.5 | 0.2 | 0.7 | 0.2 | 0.2 |
| | 10.01-15.00 | 0.5 | 0.2 | 0.5 | 0.2 | 0.5 | 0.5 | 0.2 |
| | 15.01-19.00 | 0.5 | 0.8 | 0.7 | 0.5 | 0.8 | 0.5 | 0.8 |
| | 19.01-24.00 | 0.8 | 0.5 | 1.8 | 0.8 | 0.5 | 0.8 | 0.5 |
| March | 06.01-10.00 | 0.7 | 0.5 | 1.8 | 0.5 | 0.8 | 0.7 | 0.5 |
| | 10.01-15.00 | 0.2 | 0.2 | 0.5 | 0.9 | 0.5 | 0.2 | 0.2 |
| | 15.01-19.00 | 0.2 | 0.2 | 0.5 | 0.2 | 0.7 | 0.2 | 0.2 |
| | 19.01-24.00 | 0.5 | 0.2 | 0.5 | 0.2 | 0.5 | 0.5 | 0.2 |
| April | 06.01-10.00 | 0.5 | 0.2 | 0.5 | 0.2 | 0.5 | 0.5 | 0.2 |
| | 10.01-15.00 | 0.2 | 0.2 | 0.5 | 0.9 | 0.5 | 0.2 | 0.2 |
| | 15.01-19.00 | 0.2 | 0.2 | 0.5 | 0.2 | 0.7 | 0.2 | 0.2 |
| | 19.01-24.00 | 0.5 | 0.2 | 0.5 | 0.2 | 0.5 | 0.5 | 0.2 |
| May | 06.01-10.00 | 0.7 | 0.5 | 1.8 | 0.2 | 0.5 | 0.5 | 0.2 |
| | 10.01-15.00 | 0.2 | 0.2 | 0.5 | 0.2 | 0.5 | 0.5 | 0.2 |
| | 15.01-19.00 | 0.2 | 0.2 | 0.5 | 0.2 | 0.5 | 0.5 | 0.2 |
| | 19.01-24.00 | 0.2 | 0.2 | 0.5 | 0.2 | 0.7 | 0.2 | 0.2 |
| June | 06.01-10.00 | 0.5 | 0.9 | 0.5 | 0.9 | 0.5 | 0.2 | 0.2 |
| | 10.01-15.00 | 0.2 | 0.7 | 0.2 | 0.9 | 0.5 | 0.2 | 0.2 |
| | 15.01-19.00 | 0.2 | 0.5 | 0.5 | 0.2 | 0.5 | 0.2 | 0.2 |
| | 19.01-24.00 | 0.9 | 0.5 | 0.2 | 0.2 | 0.7 | 0.2 | 0.2 |
| July | 06.01-10.00 | 0.2 | 0.5 | 0.5 | 0.5 | 1.8 | 0.5 | 0.8 |
| | 10.01-15.00 | 0.9 | 0.5 | 0.2 | 0.2 | 0.5 | 0.9 | 0.5 |
| | 15.01-19.00 | 0.2 | 0.7 | 0.2 | 0.2 | 0.5 | 0.2 | 0.7 |
| | 19.01-24.00 | 0.2 | 0.2 | 0.5 | 0.2 | 0.5 | 0.2 | 0.5 |

Vehicle Speed Coefficient

Fig. 18 Current and Daily Turning-Vehicle Table for All Road Intersections

Sunday

| | | 06.00-7.00 | | | | 07.00-08.00 | | | | 08.00-09.00 | | | | 09.00-10.00 | | | | 10.00-11.00 | | | | 11.00-12.00 | | | | 12.00-13.00 | | | |
|---|---|---|---|---|---|---|---|---|---|---|---|---|---|---|---|---|---|---|---|---|---|---|---|---|---|---|---|---|---|
| | | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 | 00 |
| INT 1 | R-TURN | 7 | 4 | 5 | 3 | 7 | 4 | 5 | 3 | 7 | 3 | 5 | 3 | 7 | 4 | 5 | 3 | 7 | 4 | 5 | 3 | 7 | 4 | 5 | 3 | 7 | 4 | 5 | 3 |
| | L-TURN | 2 | 4 | 4 | 5 | — | — | 4 | 5 | 2 | 6 | 4 | 7 | 5 | 13 | 4 | 5 | 2 | 4 | 4 | 5 | 2 | — | 5 | | 2 | 4 | 3 | 5 |
| | NO-TURN | 5 | 3 | 7 | 4 | 5 | 3 | — | 1 | 5 | 7 | 7 | 4 | — | — | 3 | 7 | 2 | 3 | 7 | 4 | 6 | 3 | 4 | | 3 | | 7 | 4 |
| | TOTAL | 14 | 11 | 16 | 12 | 12 | 7 | 9 | 9 | 14 | 16 | 16 | 12 | 12 | 17 | 12 | 15 | 11 | 11 | 16 | 12 | 15 | 7 | 14 | 3 | 12 | 8 | 15 | 12 |
| INT 2 | R-TURN | 7 | 3 | 5 | 3 | 7 | 4 | 5 | 4 | 7 | 4 | 5 | 3 | 7 | 4 | 5 | 3 | 7 | 4 | — | 3 | 7 | 4 | 5 | 3 | 7 | 4 | 5 | 3 |
| | L-TURN | 3 | 5 | 4 | 5 | — | — | 4 | 5 | 2 | 4 | 4 | 5 | — | — | 4 | 5 | 1 | 4 | 4 | 5 | 2 | 4 | 4 | 5 | 2 | 4 | 6 | 5 |
| | NO-TURN | 7 | 4 | 7 | 4 | 5 | 8 | — | 9 | 5 | 3 | 7 | 4 | 5 | 3 | 9 | 7 | 5 | 3 | 7 | 9 | 3 | — | — | 5 | 4 | 2 | 1 | 7 |
| | TOTAL | 17 | 12 | 16 | 12 | 12 | 12 | 9 | 18 | 14 | 11 | 16 | 12 | 12 | 7 | 18 | 12 | 13 | 11 | 11 | 16 | 12 | 8 | 9 | 13 | 13 | 8 | 12 | 13 |
| INT 3 | R-TURN | 7 | 4 | 5 | 3 | 7 | 4 | 5 | 3 | 7 | 4 | 5 | 7 | 4 | 4 | 5 | 3 | 7 | 4 | 5 | 3 | 7 | 4 | 5 | 3 | 4 | 5 | 3 | 3 |
| | L-TURN | 2 | 4 | 6 | 7 | — | — | 4 | 5 | 2 | 4 | 8 | 5 | 13 | | 4 | 5 | 2 | 13 | 4 | 2 | — | 5 | 4 | 5 | 4 | 4 | 5 | 5 |
| | NO-TURN | 5 | 3 | 7 | 4 | 11 | 3 | — | — | 3 | 3 | 7 | — | — | 3 | — | — | 5 | — | 3 | 1 | 3 | 3 | — | — | 3 | 7 | 4 | 4 |
| | TOTAL | 14 | 11 | 18 | 14 | 18 | 7 | 9 | 8 | 12 | 11 | 20 | 12 | 17 | 7 | 9 | 8 | 14 | 17 | 12 | 6 | 10 | 12 | 9 | 8 | 11 | 16 | 12 | 12 |
| INT 4 | R-TURN | | | | | | | | | | | | | | | | | | | | | | | | | | | | |
| | L-TURN | | | | | | | | | | | | | | | | | | | | | | | | | | | | |
| | NO-TURN | | | | | | | | | | | | | | | | | | | | | | | | | | | | |
| | TOTAL | | | | | | | | | | | | | | | | | | | | | | | | | | | | |
| INT n | R-TURN | | | | | | | | | | | | | | | | | | | | | | | | | | | | |
| | L-TURN | | | | | | | | | | | | | | | | | | | | | | | | | | | | |
| | NO-TURN | | | | | | | | | | | | | | | | | | | | | | | | | | | | |
| | TOTAL | | | | | | | | | | | | | | | | | | | | | | | | | | | | |

Fig. 19 Current and Daily Vehicle Loads Table for All Road Sections

Sunday

| | | 06.00-7.00 | | | | 07.00-08.00 | | | | 08.00-09.00 | | | | 09.00-10.00 | | | | 10.00-11.00 | | | | 11.00-12.00 | | | | 12.00-13.00 | | | |
|---|---|---|---|---|---|---|---|---|---|---|---|---|---|---|---|---|---|---|---|---|---|---|---|---|---|---|---|---|---|
| | | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 | 00 | 15 | 30 | 45 | 00 |
| RS 1-RS 2 | R-TURN | 7 | 4 | 5 | 3 | 7 | 4 | 5 | 3 | 7 | 3 | 5 | 3 | 7 | 4 | 5 | 3 | 7 | 4 | 5 | 3 | 7 | 4 | 5 | 3 | 7 | 4 | 5 | 3 |
| | L-TURN | 2 | 4 | 4 | 5 | — | — | 4 | 5 | 2 | 6 | 4 | 7 | 5 | 13 | 4 | 5 | 2 | 4 | 4 | 5 | 2 | — | 5 | | 2 | 4 | 3 | 5 |
| | NO-TURN | 5 | 3 | 7 | 4 | 5 | 3 | — | 1 | 5 | 7 | 7 | 4 | — | -- | 3 | 7 | 2 | 3 | 7 | 4 | 6 | 3 | 4 | | 3 | | 7 | 4 |
| | TOTAL | 14 | 11 | 16 | 12 | 12 | 7 | 9 | 9 | 14 | 16 | 16 | 12 | 12 | 17 | 12 | 15 | 11 | 11 | 16 | 12 | 15 | 7 | 14 | 3 | 12 | 8 | 15 | 12 |
| RS 1-RS 7 | R-TURN | 7 | 3 | 5 | 3 | 7 | 4 | 5 | 4 | 7 | 4 | 5 | 3 | 7 | 4 | 5 | 3 | 7 | 4 | — | 3 | 7 | 4 | 5 | 3 | 7 | 4 | 5 | 3 |
| | L-TURN | 3 | 5 | 4 | 5 | — | — | 4 | 5 | 2 | 4 | 4 | 5 | — | — | 4 | 5 | 1 | 4 | 4 | 5 | 2 | 4 | 4 | 5 | 2 | 4 | 6 | 5 |
| | NO-TURN | 7 | 4 | 7 | 4 | 5 | 8 | — | 9 | 5 | 3 | 7 | 4 | 5 | 3 | 9 | 7 | 5 | 3 | 7 | 9 | 3 | — | — | 5 | 4 | 2 | 1 | 7 |
| | TOTAL | 17 | 12 | 16 | 12 | 12 | 12 | 9 | 18 | 14 | 11 | 16 | 12 | 12 | 7 | 18 | 12 | 13 | 11 | 11 | 16 | 12 | 8 | 9 | 13 | 13 | 8 | 12 | 13 |
| RS 2-RS 5 | R-TURN | 7 | 4 | 5 | 3 | 7 | 4 | 5 | 3 | 7 | 4 | 5 | 7 | 4 | 4 | 5 | 3 | 7 | 4 | 5 | 3 | 7 | 4 | 5 | 3 | 4 | 5 | 3 | 3 |
| | L-TURN | 2 | 4 | 6 | 7 | — | — | 4 | 5 | 2 | 4 | 8 | 5 | 13 | | 4 | 5 | 2 | 13 | 4 | 2 | — | 5 | 4 | 5 | 4 | 4 | 5 | 5 |
| | NO-TURN | 5 | 3 | 7 | 4 | 11 | 3 | — | — | 3 | 3 | 7 | — | — | 3 | — | — | 5 | — | 3 | 1 | 3 | 3 | — | — | 3 | 7 | 4 | 4 |
| | TOTAL | 14 | 11 | 18 | 14 | 18 | 7 | 9 | 8 | 12 | 11 | 20 | 12 | 17 | 7 | 9 | 8 | 14 | 17 | 12 | 6 | 10 | 12 | 9 | 8 | 11 | 16 | 12 | 12 |
| RS 3-RS 8 | R-TURN | | | | | | | | | | | | | | | | | | | | | | | | | | | | |
| | L-TURN | | | | | | | | | | | | | | | | | | | | | | | | | | | | |
| | NO-TURN | | | | | | | | | | | | | | | | | | | | | | | | | | | | |
| | TOTAL | | | | | | | | | | | | | | | | | | | | | | | | | | | | |
| RS n-RS n+1 | R-TURN | | | | | | | | | | | | | | | | | | | | | | | | | | | | |
| | L-TURN | | | | | | | | | | | | | | | | | | | | | | | | | | | | |
| | NO-TURN | | | | | | | | | | | | | | | | | | | | | | | | | | | | |
| | TOTAL | | | | | | | | | | | | | | | | | | | | | | | | | | | | |

Fig. 20 Updating Current Intersection Node Records
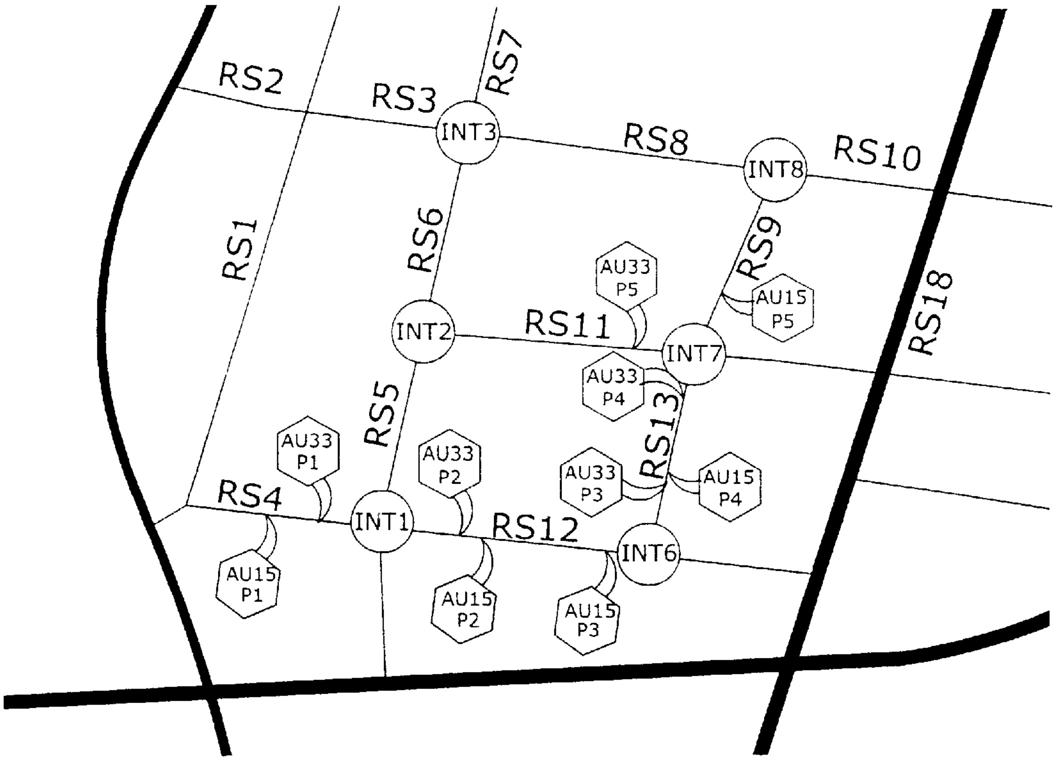
| | T1 | T2 | T3 | T4 | T5 |
|---|---|---|---|---|---|
| AU33 | P1<br>RS4 | P2<br>RS12 | P3<br>RS13 | P4<br>RS13 | P5<br>RS11 |
| AU15 | P1<br>RS4 | P2<br>RS12 | P3<br>RS12 | P4<br>RS13 | P5<br>RS9 |
| AU17 | RS4 | RS5 | RS11 | RS9 | RS9 |
| AU18 | RS5 | RS5 | RS11 | RS13 | RS12 |
| AU19 | RS4 | RS12 | RS12 | RS13 | RS9 |
| AU21 | RS5 | RS11 | RS11 | RS9 | RS9 |
| AU55 | RS4 | RS12 | RS12 | RS13 | RS9 |
| | T1-T2 | T2-T3 | T3-T4 | T4-T5 | T5-T6 |
|---|---|---|---|---|---|
| INT1 | AU33<br>AU15<br>AU17<br>AU19 | | | | |
| INT2 | | AU17<br>AU18 | AU17<br>AU18 | | |
| INT3 | | | | | |
| INT4 | | | | | |
| INT5 | | | | | |
| INT6 | | AU33 | AU15<br>AU19 | AU18 | |
| INT7 | | | AU18<br>AU21 | AU33<br>AU15<br>AU55 | |

TRAFFIC INFORMATION GATHERING VIA CELLULAR PHONE NETWORKS FOR INTELLIGENT TRANSPORTATION SYSTEMS

FIELD OF THE INVENTION

This invention relates generally to traffic control systems. More specifically, the present invention relates to a traffic information gathering system using cellular phone networks for automated intelligent traffic signal control.

BACKGROUND OF THE INVENTION

Intelligent traffic control systems comprise three major components: hardware, traffic control models, and information gathering systems.

After briefly reviewing the first two components, we will present the state of the art of conventional information gathering systems.

Numerous Traffic Signal Controllers are used extensively throughout the United States and elsewhere around the globe. Most controllers are computer activated and use sophisticated software models to achieve optimization of traffic flow.

In the context of the present invention, we will concentrate on the operating models and algorithms that control such traffic signal controllers. Traffic control models underwent a radical change in the mid-1960's when digital computers began to be increasingly utilized in traffic control systems. Computers allowed creation of actuated controllers that have the ability to adjust the signal phase lengths in real time in response to traffic flow.

Modes of controller operation can be divided into three primary categories: Pre-timed, actuated (including both semi-actuated and fully actuated), and traffic responsive. Under pre-timed operation, the master controller sets signal phases and cycle lengths at predetermined rates based on historical data. Actuated controllers operate based on traffic demands as registered by the actuation of vehicle and/or pedestrian detectors.

Semi-actuated controllers maintain green on the major street except when vehicles are detected on minor streets, and always return right of way to the major street. Fully actuated controllers rely on detectors for measuring traffic flow on all approaches and make assignments of the right of way in accordance with traffic demands.

Traffic responsive controllers respond to inputs from traffic detectors and may react in one of the following ways:

Use vehicle volume data as measured by traffic detectors;

Perform pattern matching: the volume and occupancy data from system detectors are compared with profiles in memory, and the most closely matching profile is used for decision-making;

Perform future traffic prediction: projections of future conditions are computed based on data from traffic detectors.

As the use of traffic responsive controllers has been gaining momentum, the importance of methods of gathering information has also greatly increased.

Conventional Methods of Gathering Traffic Condition Information

Due to ever increasing traffic volumes, traffic control and information acquisition have become a central part of the overall traffic management strategy. Numerous computerized traffic models have become dependent on real time traffic event updates in complex traffic signaling applications.

Generally, dynamic traffic data are gathered by three methods:

1. Road sensor devices such as induction loops, traffic detectors, and TV cameras mounted on poles;
2. Mobile traffic units such as police, road service, helicopters, weather reports, etc.
3. Cellular mobile communication systems, using GPS or similar equipped vehicle-tracking services, usually in closed environments, such as individual private organizations, or commercial entities.

The disadvantages of these conventional data collection methods can be summarized as follows:

1. Relatively high cost of capital investment to install fixed road devices, especially in existing road infrastructures;
2. Relatively limited number of organizations such as trucking, delivery and other service companies utilizing GPS reporting vehicles and relying on proprietary rights of the collected traffic data;
3. Apart from the relatively small number of cars equipped with required GPS devices necessary for precise position determination, generally only small geographical areas are effectively covered due to specific nature of service tasks.

One conventional way to measure traffic flow is by using buried loops in the pavement. These loops create a magnetic field, which is disturbed by the magnetic materials in a car passing over it. A special device in the traffic control cabinet monitors the buried loop and reports to the controller when it has been disturbed. Sometimes microwave detectors resembling a closed circuit TV camera mounted on a pole are used.

Some work has been done recently on mobile traffic data generation using GPS reporting devices mounted on individual cars to provide positioning information of the vehicle via a wireless mobile communication system.

These conventional systems can also provide information on road conditions, weather conditions, etc. The expenditures related to these mobile systems are much more cost-effective than the traditional methods using fixed road metering (such as that disclosed in U.S. Pat. No. 6,012,012 to Fleck et al.). The disadvantage of these systems is the relatively limited number of cars equipped with required GPS devices necessary for precise position determination. Therefore, only a relatively small geographical areas that can be effectively covered.

In another conventional system, GSM phones are combined with built-in GPS devices to enable hybrid location capabilities, based on the GSM network as well as an integral GPS receiver. Mobile Phone Telematics Protocol (MPTP) facilitates hybrid positioning, transferring and managing of information. Mobil phone providers integrate resource management, traffic reporting, telematics, safety and security systems and provide the data to their mobile terminals. With the help of MPTP, cell phones are connected to an existing emergency center and can obtain position updates and emergency call messages. GSM/GPS phones can also provide a wide range of optional features, such as safe area tracking, route navigation, and position requests.

The present invention proposes a system and method that overcomes the shortcomings of conventional traffic data gathering systems by utilizing the general wireless (cellular) telephone information network data. The exemplary system and method is equally compatible with the GSM, CDMA or PDC wireless telephone systems, since it does not depend on system specific features. The data from moving vehicles is collected and fed into the system continuously. The system filters and cleans the data by applying intelligent heuristic algorithms and produces information on traffic situations in real time that can be supplied to automated traffic controllers. This eliminates the need for developing a dedicated mobile wireless information gathering fleet or other high cost devices requiring a large amount of personnel and long reaction times for traffic events such as accidents and traffic congestion.

In brief, the advantages of the exemplary information collection system of the present invention over the prior art sensor based systems may be summarized as follows:

Advantages

1. No need for costly infrastructure: detectors, loops, etc.;
2. Low recurring costs associated with obtaining information;
3. Comprehensive coverage of large geographical regions;
4. Constant improvement in measurement precision;
5. Information stored in the database allows for the performance of various tasks which are difficult or impossible to perform under traditional methods of data collection, such as studying travel profiles, calculating travel times under congestion conditions, calculating various statistics related to roads, road sections, etc.

SUMMARY OF THE INVENTION

In view of the shortcomings of the prior art, it is an object of the present invention to provide a system and method for optimizing traffic flow based on information received from wireless telephone systems.

The disadvantages of the prior art may be overcome by using the wireless networks as the means to provide location information as described herein. Technologically, this may be achieved by measuring the signals traveling between a moving cell phone and a fixed set of base stations. This approach takes advantage of the large pool of existing cell handsets. For example, in the United States along there are presently about 50 million cellular handsets. And any necessary modifications, such as specialized location equipment, can be placed on the network rather than in the handsets.

The present invention comprises an intelligent data gathering and processing system based on existing cellular phone networks, and utilizes real time cell phone position data for reconstructing concurrent traffic conditions.

A primary function of the exemplary system of the present invention is the construction and maintenance of lists of vehicles moving along all road sections at particular points in time. This may be achieved by tracking all in-vehicle cell phones within a given region. At each moment, the system maintains a series of such lists associated with a limited number of past consecutive moments. This allows the system to obtain accurate estimates of the total number of vehicles traveling on each specific road section, together with their direction of travel and average velocity. Based on these data, the system is able to 1) compute real time traffic loads for various roads and road sections, 2) generate detailed lists of vehicle turning movements, real time turning data for all relevant intersections, and 3) other traffic parameters. The resulting information can then be passed on with minimum delay to the automated traffic control systems for the purpose of adjusting signal intersection timings to calculate other traffic related parameters of interest.

To achieve these purposes, the system uses the position data of a plurality of cell phones, whether located in moving vehicles, held by pedestrians in moving, or stationary positions, and processes them in an intelligent way to translate their coordinates into relevant traffic information. The system utilizes heuristic algorithms to differentiate between vehicle based cell phones and other cell phone users. Furthermore, the system identifies multiple phone users in a common vehicle to combine them into a single vehicular entity.

Once each group of cell phones has been associated with a common vehicle, it's the vehicle's position is calculated, recorded in the database, and assigned to an appropriate road section according to the coordinates of its cell phones at a particular moment.

After recording a pre-assigned number of these positions in a particular time interval, the system generates a continuos path profile (or movement profile) for a given vehicle. Such path profiles constructed and stored as for a large number of vehicles make it possible to calculate traffic loads for all road sections, turning movement volumes at various intersections, and other parameters that can be fed as inputs into traffic control systems. Moreover, the dynamic plurality of path profiles enables the preparation of statistical traffic data tables, the calculation of statistical predictions of travel times along road sections, and the obtaining of other desirable traffic condition parameters.

Obviously, the success of these tasks depends on the quality of initial location data. Improvements in the location technology of wireless networks will undoubtedly lead to new improved performance of traffic information gathering systems and their applications to Intelligent Transportation Systems.

The exemplary system and method is expected to and enhance the overall traffic control capabilities of conventional systems by providing a maximum range of traffic related information.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures:

FIG. 1 is a flowchart of an exemplary method of the present invention;

FIG. 2 is a table illustrating creation of current cell phone lists containing cell phone IDs, positions, and recorded times at intervals T to T4;

FIG. 3 is a table illustrating creation of cell phone path profile lists and with pending cell phone lists;

FIG. 4 illustrates initial discrimination between phones in moving vehicles and other phones;

FIG. 5 illustrates an exemplary method for eliminating false cell phone records;

FIG. 6 illustrates missing data imputation and elimination;

FIG. 7 is a table illustrating creation and storage of pending phone lists;

FIG. 11 illustrates criteria for placing cell phones into vehicular clusters;

FIG. 12 illustrates groping cell phones into vehicular clusters;

FIG. 13 are tables illustrating placing vehicles on road sections;

FIG. 14 illustrates a method for updating entry and exit lists on road sections;

FIG. 15 illustrates a regression-based prediction of current travel times;

FIG. 16 illustrates the preparation of statistical tables based on real time traffic information;

FIG. 17 illustrates the preparation of a seasonal statistical traffic data table for each road section;

FIG. 18 illustrates a current and daily turning-vehicle table for road intersections;

FIG. 19 illustrates a current and daily vehicle load table for road sections; and FIG. 20 illustrates the updating of current intersection node records.

DETAILED DESCRIPTION OF THE INVENTION

Figure 8:
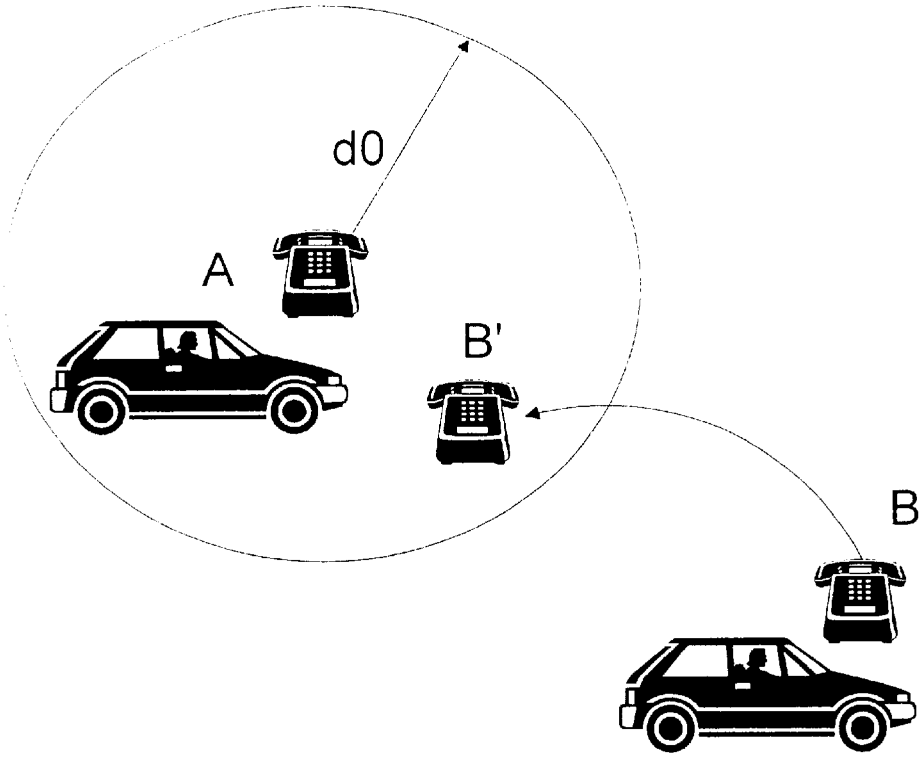
FIG. 8 illustrates a first exemplary Type A Error where two vehicles are clustered together inducing a large measurement error.

One purpose of the present invention is to maximize the acquisition of important traffic event data with minimum sacrifices with respect to the quality or the scope of the available data. Naturally, the extent and the precision of the overall data collected from the plurality of cell phones in the given network will largely depend on the total number of current cell phone users and also on the technology used for measuring and recording data. It should be noted here that for purposes of the present invention's data collection any cell phone in an "on" position will be considered as part of the reporting system.

The present invention does not deal with problems of precision of the cell phone location methods but rather presumes existing cell phone location technologies and contemplates their progressive improvement in the near future.

It is also assumed that increasing competition in the cell phone market will further enhance the already large public popularity of cell phone usage.

In the exemplary system, all relevant cell phone position data will be obtained directly from the cell phone network operator without any involvement of the individual phone user.

FIG. 1 is a flow diagram of an exemplary embodiment of the inventive cell phone gathering system showing the main steps of data exchange flow. As shown in FIG. 1, at Step 1, the cell phone records are obtained from the network operator for 100, 102, 104, 106, etc. At Step 2, the current cell phone list and a series of previous cell phone lists are created and stored. At Step 3, temporary cell phone path profiles (Positioning Algorithm) are created. At Step 4, initial discrimination between phones in moving vehicles and other phones is preformed. If a phone is determined not to be within a car, it is rejected. At Step 5, untenable cell phone positions (outliers) are eliminated. At Step 6, missing cell phone positions are imputed. At Step 7, pending phone lists are prepared, stored and processed. At Step 8, active cell phones are grouped into vehicular clusters (Vehicle Identification Procedure). At Step 9, the representation of vehicles by vehicular clusters is performed. At Step 10, travel path profile for each vehicle (Speed, Direction of Travel) is created. At Step 11, real time traffic related information is attached to road sections. At Step 12, the statistical traffic data table is maintained. At Step 13, the statistical predictions of travel times along various road sections are performed. At Step 14, true vehicle loads for all road sections (Adjusting for Vehicles Without Cell Phones) are prepared. At Step 15, the data for automated actuated traffic signal controllers and various traffic optimization programs is updated.

The following is a list of acronyms used throughout the specification:

APL=Adjusted Phone List

AU=Traveling Vehicle

CP=Cell Phone

CPL=Current Phone List

CVL=Current Vehicle List

ENL=Entry List

ENT=Entry Time

EXL=Exit List

EXT=Exit Time

ID=Identification Number

INT=Road Intersection Node

OP=Outlying Position

PEPL=Pending Phone List

PPL=Previous Phone List

PPP=Phone Path Profile

PVL=Previous Vehicle List

RS=Road Section

RSL=Road Section List

TSC=Traffic Service Center

Obtaining Cell Phone Records from the Network Operator

It is assumed that the cell phone network operator is capable of providing all the necessary information on the plurality of active cell phone units in the network. The process of collecting and transmitting cell phone position data is well known and described in the literature.

For the purposes of the present invention it is time and cost effective if the data are received in the form of periodic data packets in real time, such as, 1 to 3 minutes, for example.

The packet file consists of a list of records, each for a single cell phone (CP) containing phone's unique ID number, the recorded time of signal reception t, and its location P (x, y):

$$\text{record}(CP)=(ID,t,x,y)$$

For the purposes of protecting privacy of individual cell phone users, an automatic coding system set up by the network operator will assign each cell phone number a unique ID reference number. In the present invention, only the reference ID will be used to identify each cell phone record.

Creating and Storing the Current Cell Phone List and a Series of Previous Lists

As shown in FIG. 2, at each time period T, the Traffic Service Center (TSC) compiles a Current Phone List (CPL) consisting of cell phone records (in the sense defined above) of all available active cell phones in the system database according to their ID reference numbers. At the next time period T1 a new CPL is similarly compiled and recorded, with the first CPL becoming the Previous Phone List (PPL) number 1, PPL1. At the following period, a new CPL is compiled, the CPL becomes PPL1, and PPL1 becomes PPL2, etc. For the purposes of analysis (see below), it is necessary to store at any given moment a predetermined number of these lists, such as, 4 or 5.

Creating Temporary Cell Phone Path Profiles

At this stage it is necessary to create a temporary Phone Path Profile (PPP) for each active cell phone CP and correlate individual cell phone positions with the digital map. The map database which is connected to global digital map contains a list of all road sections RS each with a number of fixed attributes such as road name, the names of two adjacent intersection nodes INT, allowable speed, number of lanes, turns to and from the nodes, sensor devices if available, automatic traffic control signals, and all other pertinent data. For each individual CP, we define its original path profile PPP as a series of its records stored in the CPL and PPL lists as described above.

The present invention assumes that the cell phone path profile PPP for each CP is preferably constructed if the predetermined number of its latest 5 recorded positions P1, P2, . . . , P5 is available on the CPL (see FIG. 2).

FIG. 3 illustrates an exemplary PPP table and PEPL table. The PPP table will contain each CP record with its scored rating according to the total number of positions P1, P2, . . . , P5 it obtained, where the final score between −4 to 0 will reflect the number of missing positions. In the event that the PPP list receives a score of −1, it is entered into the Pending Phone List (PEPL) created for temporarily storing incomplete PPPs. If in the next time period T, a new CP position P6 is obtained, then the PPP can be completed, otherwise construction of the PPP will be discontinued, e.g. CP4. All other PPP scores i.e. −2, −3, etc. (see CP6 and CP7) will be discontinued immediately.

Due to measurement errors, cell phone positions will generally not lie on road sections, but rather in the vicinity of road sections. To correct for this, the Positioning Algorithm presented below is used for finding the most probable positions of cell phones on road sections.

Positioning Algorithm

Given a point P' (recorded cell phone position) and a class of road sections RSs, the Positioning Algorithm searches for a point P located on one of the road sections RS and at a shortest distance (usually perpendicular) from the point P'. The area of search is bounded by the circle C centered at P' and having radius M (maximum acceptable measurement error), so that only road sections crossing this circle are considered as candidates for locating a point P. In case a road section is located within the circle C but a perpendicular projection will not find any RS, the point closest to point P' is determined as one of its endpoints. Of those closest points, the point nearest to point P' is selected and established as point P.

After all recorded CP positions have been adjusted and associated with individual RSs, the Adjusted Phone List (APL) is created with all cell phones now positioned on road sections.

Construction of Continuous Path Profiles

In general, cell phone path profiles may have different recorded times so that for any given group of phones there may be no time moment at which positions of all group members have been measured. In contrast, below we will often need positions of all members of a group simultaneously, i.e. for calculating distances between phones for the purpose of discriminating between two phones in a common vehicle vs. two vehicles with a single phone each, etc. To be able to calculate positions of a number of phones simultaneously, we will construct continuous path profiles, i.e. curves or trajectories that the phones in question have most likely followed during the predefined time interval.

Here we will be assuming that the predefined number of cell phone positions has been recorded and all of them are good. The treatment of outlying positions and of missing positions are described below. For constructing continuous curves it is suggested that linear regression techniques are used as follows.

Construction of Regression Curves

First, consider the case when all, say, five measured positions $p_1, p_2, \ldots, p_5$ are located on a common section RS (probably, after some initial positioning).

Our major assumption is that we can perform valid interpolations and extrapolations within the given section.

Using linear regression techniques, we can construct a regression curve of coordinates x on t based on the five observed-paired values $(t_1,x_1),(t_2,x_2), \ldots ,(t_5,x_5)$. The obtained linear function $x=x(t)$ could then be used for computing x positions anywhere on the road section RS. Similar calculations produce a curve $y=y(t)$ for y positions. In other words, the moving position of the phone can be construed as a function $p=p(t)$ of location in time. Having functions $x=x(t),y=y(t)$, we will be able to calculate the position of the phone at any time moment $t_1$ as $p_1=p(t_1)$, or $x_1=x(t_1)$, $y_1=y(t_1)$.

Within certain precision limits, it might be even possible to use the functions $x=x(t)$ and $y=y(t)$ for calculating phone velocities on the section RS.

When we have less than five positions on a single section, say, four, three, or even two, we could still perform linear regression or interpolation though precision although reliability might suffer.

On the other hand, one must be warned against attempting extrapolation over section boundaries. It appears that while the assumption of validity of interpolation and extrapolation within one road section is tenable, extrapolating across section boundaries is not safe and is not recommended. This is due to abrupt changes in speed that often occur while switching to other sections, long waiting times near intersections, jams at section ends, turning point delays, sudden slowdowns and stops that drivers do before entering highways, etc.

Initial Discrimination between Phones in Moving Vehicles and Other Phones

Once a PPP has been obtained, it is possible to estimate the corresponding CP's direction of movement, distance traveled, travel speed, etc. Here we will put some of these attributes to use for separating phones located in moving vehicles, on the one hand, and from all other phones on the other hand.

Among those other phones may be stationary phones such as phones inside houses, phones left in parked cars, etc., slowly moving phones such as phones held by pedestrians, fast moving phones located in trains, held by bicycle and motorcycle riders which may be moving in the open without regard of any roads, and many other cases of phones difficult to envision and enumerate.

For the purpose of discriminating phones located in moving vehicles, we will isolate, formalize and categorize some characteristics regularly exhibited by most of such phones.

To simplify presentation, we assume that 4 observed phone positions P1, P2, P3 and P4 are being used, and that all of them are valid positions. Increasing the number of positions to five or six will simply multiply the number of cases to be enumerated without introducing new ideas. Problems related to bad observations, i.e., missing observations and outliers, will be dealt with below.

The Phone-In-Moving-Vehicle Recognition Algorithm

As shown in FIG. 4, consider a cell phone CP1 whose path profile PPP contains a series of four (4) valid recorded positions: current is position P4, previous position P3, the position before previous P2, and still earlier position P1. The speeds of the phone calculated for moving between those positions are as follows: the speed between P3 and P4 was v4, between P2 and P3 was v3 and between P1 and P2 was v2. Assume that we have two categories of roads, large roads (say, highways) LR, and small roads (all others) SR.

We will use two basic criteria for identifying phones in vehicles: a cell phone on a large road is probably a vehicle phone and a cell phone that traveled with a speed v larger than some critical speed, say, 4 miles/hour (7 km/hour) is a vehicle phone.

CP position on a large road LR is obviously not a foolproof criterion, and, unfortunately, a higher speed is not either since it may have resulted from measurement errors. To attain more confidence in our conclusions, we will rely on combinations of these criteria in the following ways.

If at least two positions say P1 and P2 of the recorded PPP lie on a large road section RS, we conclude that the phone is a vehicle phone—see lines 1 to 6 in FIG. 4. Further, if P1 of the PPP lies on a large road and a large speed, say, v>4 miles/hour (7 km/hour) was calculated for at least one traveled section, we also tend to conclude that the phone is a vehicle phone—see lines 7 to 12 in FIG. 4.

Still further, if two adjacent sections belong to small roads RS1 and RS2 and both corresponding speeds are large, we also conclude that the phone is a vehicle phone—see lines 13 and 14.

As illustrated in FIG. 4, 14 combinations of CP positions and their speeds (in the case of 4 available valid positions) where the algorithm can surely or ahnost surely establish that the CPs are located in traveling vehicles.

The algorithm based on FIG. 4 may be further developed and refined. For example, Table 1 does not relate to a possible traffic situation where a large number of CPs are located on the small road SR (say in a form of continuous "platoon"), but their overall speed is consistently small on average (say for T1, T2, . . . , T5) v<1.8 miles/hour (3 km/hour) and the overall distance between most CP positions (i.e. P1, P2, . . . , P5) is small (i.e. d<33–50 ft. (10–15 m)). In such a situation an additional analysis of the surrounding road sections adjacent to intersection INT1 may reveal similar conditions prevailing on RS2, RS3, etc. If no CPs have left the RS1, RS2 or RS3 and the INT1 intersection (as described later) then the conditions for traffic "jam" may exist. The cell phones may still be located in vehicles and therefore be valid, but are temporarily delayed in a traffic slowdown. This situation should then be classified separately and reported as a traffic jam.

Eliminating Untenable Cell Phone Positions (Outliers)

This stage relates to further refining each CP's recorded progression path PPP. For the purposes of this invention, it is required that all 5 CP's recorded positions P1, P2, . . . , P5 can be tabulated into a feasible progression path PPP.

At the first stage, we use the Positioning Algorithm (see description above) and replace the recorded available phone positions CP1 (P1, P2, . . . , P5) by other, most feasible positions located on the nearby road sections. The Positioning Algorithm searches for the closest road section RS within the given radius of the vehicle position P. In this fashion all available positions (P1, P2, . . . , P5) will be placed on closest road sections RS.

The limitation of this present version of the Positioning Algorithm is that it always selects the closest possible RS, which may not always conform to the general travel path PPP of the observed vehicle. For instance, in a dense urban situation where many roads are located within the same positioning radius it may happen than an "inappropriate" RS is preferred by the Positioning Algorithm. If the road selected by the Positioning Algorithm has no physical link to other positions, say P3, it will be defined as outlying position OP1 with respect to the progression path PPP constructed from all available positions (P1, P2, . . . , P5).

FIG. 5 shows several combinations of possible outlying position situations on PPP.

A. Position P1 is placed at RS1 which has no direct link to the other four remaining positions placed at RS5, RS6, RS7 and RS8 respectively. In this case, P1 will be considered an outlying position OP1, and the PPP will obtain score −1 (one outlying position) and will be stored in the pending phone list PPL. If the next position P6 obtained from the next CPL is valid, i.e. not an OP, position P1 will be rejected and the PPP will be included in the calculations.

B. In the case when P5 is recognized as an OP1, the event will be processed as above.

C. Referring to FIG. 6, in the case when a single OP is recorded at P3, or P4, this OP will be rejected and replaced by another, so called imputed position. To calculate this imputed position, we can firstly construct a regression curve through the remaining 'good' positions as described in the algorithm for construction of regression curves above, and then calculate the imputed position as the position on this regression curve for the corresponding time moment.

D. In case two or more positions are OP positions, the PPP will be rejected and no imputation will be attempted.

E. In the case where after P1 and P2 all subsequent positions at P3, P4, and PS are technically plausible, but incompatible to each other, an additional CPL should be constructed for further consideration.

To summarize: for the purpose of construction of continuous path profiles PPP outlined above, outlying positions OPs are misleading records that may severely impair or invalidate the PPP which has been influenced by it. Therefore, after having been detected OPs will be removed (the process sometimes called cleaning the data) and replaced by unobserved but plausible positions. A standard technique for doing this is to use the linear regression methods as described above in the algorithm for construction of regression curves.

Making Imputations for Missing Cell Phone Positions

In case of a single missing observation, i.e. a missing value in the recordings of the CP positions P1, P2, . . . , P5 due to technical difficulties or any other reasons, imputation procedures similar to those used in cases of outlying observations OP's described above will be used. This is in order to utilize all available data to a maximum for a particular P (see FIG. 6).

If more outlying observations or missing data have been detected, however, no further attempts at constructing a PPP will be made for a corresponding cell phone, as the available data are judged insufficient for creating a viable PPP.

Preparing, Storing and Processing Pending Phone Lists

As mentioned above, under the accepted methodological approach, no progression path PPP containing less than the predetermined number of recorded positions of a CP can be processed. In order to avoid unnecessary loss of recorded information, however, it is deemed necessary to create temporary pending phone lists PEPL to store incomplete information.

FIG. 7 is a table illustrating creation and storage of pending phone lists. In FIG. 7, it is assumed that in the process of updating a CPL, additional position information for CPs on PEPLs may be obtained, the corresponding PPPs completed and CPs records cleared from the pending phone lists. The PEPLs may contain additional positions for each CP such as position record P6 at time T6 if necessary. Longer records are not necessary but may be used in some cases.

Grouping Active Cell Phones into Vehicular Clusters

It is necessary at this stage to introduce the Vehicle Identification Procedure. Simply, this procedure analyzes CPs that display similar PPP characteristics in a given time period.

The purpose of this procedure is to identify and eliminate the possibility that several CPs traveling in a single vehicle will mistakenly be recorded as a number of moving vehicles due to measurement inaccuracies at a given period and thereby misrepresenting the actual number of moving vehicles or the "vehicular load" on a particular road section RS.

The procedure will attempt to identify and analyze the following situations:

A. Two or more CPs produce consistently similarly placed positions (P1, P2, . . . ,P5) for a given period of time (i.e. T1, T2, . . . ,T5), i.e. the measured distance between CP1 and CP2 is smaller than a predetermined distance $d_0$ (say, 10 m).

It will then be assumed that the corresponding CPs are located in a common cluster CL and are located in the same traveling vehicle AU (see FIG. 7).

B. Two or more CPs produce several similar recorded positions (P1, P2, P3, and P4) while in the remaining position P5 $d_0 \geqq 10$ m.

In such a situation, the procedure will attempt to correct the P5 measurement by introducing another position P6 at period T6 as has been done in cases of outlying observations described above (see FIG. 6).

C. If two or more CPs produce several similar positions (i.e., at T1, T2), but there is sufficient variance in their other recorded positions (T3, T4 and, say, T5) to prevent their clustering into a common vehicular cluster, no further measurements will be attempted.

Vehicle Identification Procedure

A problem to be solved is identifying which groups of cell phones belong to a common vehicle and which to different vehicles. The input data consist of a series of lists (say, 5 or 6 lists) of cell phone records recorded at sequential time moments $t_0, t_1, \ldots t_s$. The solution is deemed to be a list of phone clusters in which phones in a single cluster supposedly belong to the same vehicle while phones in different clusters are located in different vehicles.

It should be clear from the start that it is a difficult problem in that most cases cannot be solved without erroneous decisions even if phone positions were measured and recorded without errors. With measurement errors, and especially with large measurement errors, it becomes more difficult still.

Below, we describe what is called the Vehicle Identification Procedure, which consists of three steps and uses elementary mathematical techniques and heuristic, or common sense, considerations. It relies on a number of assumptions that could be grouped into two major assumptions:

1. There are only few large measurement errors; and
2. All the records used are good enough: no newly appearing phones within the defined time period, no missing or missrecorded positions, etc., except a few large errors as postulated in assumption 1.

The first assumption appears sensible enough: a large number of large errors will render the task unsolvable. The second assumption may be considerably relaxed in view of the Agglomeration Procedure described below.

The errors made by any decision procedure can be classified into to categories:

Type A errors: Two or more cell phones located in separate vehicles are grouped into a common cluster; and Type B errors: Two or more phones located in a common vehicle are put into different clusters.

Figure 9:
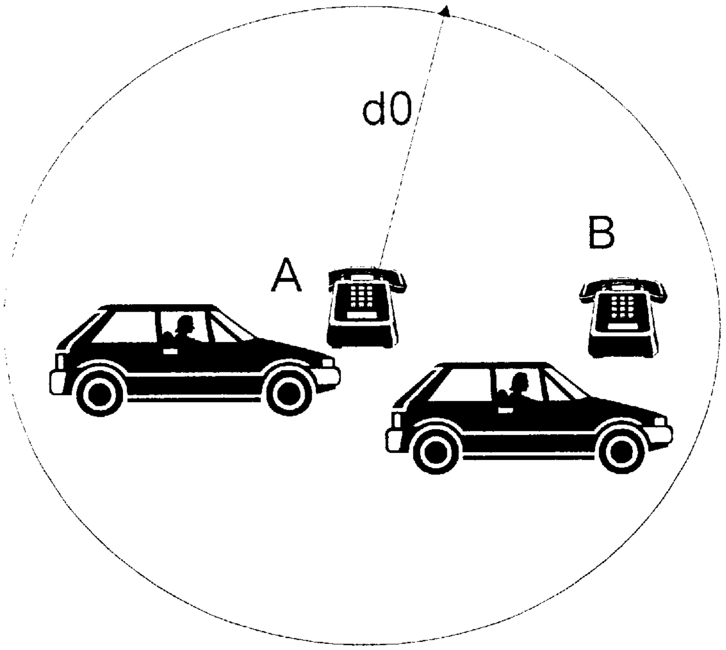
FIG. 9 illustrates a second exemplary Type A Error where two vehicles are clustered together by travelling close to one another.
Figure 10:
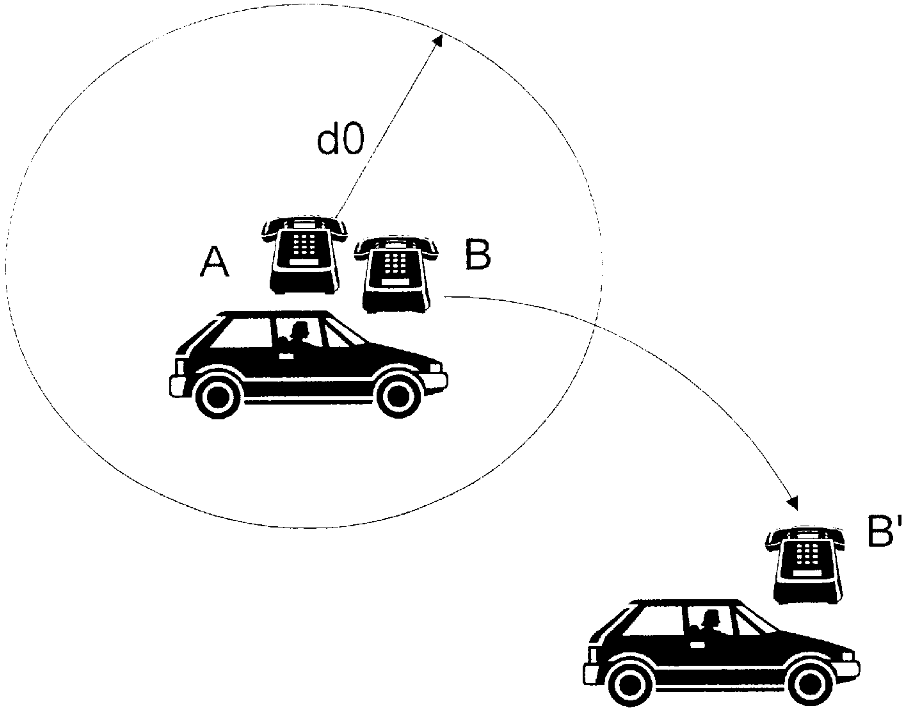
FIG. 10 illustrates an exemplary Type B Error where two phones in one vehicle are clustered into different clusters due to a large measurement error.

Referring to FIGS. 8 and 9 it is shown that Type A Errors arise mainly in two situations: under large measurement errors, such as shown in FIG. 8, or when vehicles travel close one to another, such as shown in FIG. 9. Errors of Type B arise because of large measurement errors, such as shown in FIG. 10.

Though the Vehicle Identification Procedure described below is not based on any explicit optimization principle, it is expected to produce relatively small number of errors of both types under normal traffic situations. It consists of three steps (or sub-procedures):

Step 1: Initial Clustering Procedure

The cell phone list at time to is used for initial grouping of the available phones into clusters. The algorithm developed for the purpose is called the Initial Clustering Algorithm and is described in detail below.

Step 2: Sequential Splitting Procedure

Using phone lists at moments $t_0, t_1, \ldots t_s$, the clusters constructed at Step 1 are sequentially split into smaller clusters in an attempt to eliminate or reduce type A errors. No attention is being paid until now on type B errors. The proposed algorithm is called the Split Algorithm.

Step 3: Agglomeration Procedure

Relying on the assumption of small number of large measurement errors, we now attempt to eliminate some unit clusters and also to fuse some of the existing clusters into bigger ones with the purpose of reducing the number of type B errors. Accordingly, the suggested Agglomeration Algorithm consists of two algorithms: the Kill Unit Clusters Algorithm and the Fusion Algorithm.

Before giving a detailed description of Steps 1–3, we introduce a necessary notation.

Cell phone records are denoted by small letters: $a=(ID_a, t_a, x_a, y_a)$, $b=(ID_b, t_b, x_b, y_b)$, $c=(ID_c, t_c, x_c, y_c)$.

The distance between two phones $a=(ID_a, t_a, x_a, y_a)$ and $b=(ID_b, t_b, x_b, y_b)$ is calculated as $d(a,b)=\sqrt{(x_a-x_b)^2+(y_a-y_b)^2}$.

Clusters are defined as the ordered (by increasing IDs) sets of phones and are denoted by capital letters: $C=(c_1, c_2, \ldots, c_k)$. Diameter of a cluster C is the maximum distance between its phones: $d(C)=\max_{1 \leqq i<j \leqq k} d(c_i, c_j)$. Unit clusters consist of single phones and have diameter 0. The distance between phone a and cluster C is calculated as $d(a, C)=\max_{1 \leqq j \leqq k} d(a, c_j)$. The distance between two clusters $A=(c_1, c_2, \ldots, c_r)$ and $C=(c_1, c_2, \ldots, c_k)$ is calculated as $d(A, C)=\max_{1 \leqq i \leqq r, 1 \leqq j \leqq k} d(a_i, c_j)$.

Step 1: Initial Clustering Procedure

Initial grouping of a set of phones into clusters can be done by using a simple distance relation criterion: if distance between the phones is no larger than some predefined critical value do (say, 10 m, or 15 m to accommodate large buses), they are put into a common cluster. Note, however, that due to non-transitivity of this relation and multiplicity and complexity of possible traffic situations, any method of partitioning phones into non-overlapping groups based on distance relation is likely to create numerous type B errors. Therefore, to reduce the potential number of type B errors, it is preferable to begin by grouping phones into a super-partition in which a phone may enter into a number of clusters simultaneously. Later, those contradictory patterns will be resolved, and multiple entries reduced to single entries (see Kill Unit Clusters in the Agglomeration Procedure below).

Assume that we have a configuration of elements (phones) $A=\{a_1,a_2, \ldots ,a_n\}$, which implies both the given set of elements and known distances between all pairs of elements.

Formally, a super-partition $\Gamma=(C_1,C_2, \ldots ,C_k)$ consisting of clusters $C_1,C_2, \ldots ,C_k$ of elements $a_1,a_2, \ldots ,a_n$ is defined as a system of clusters satisfying the following requirements:

1. Any element $a_j$ in the configuration A belongs to at least one cluster $C_i$, and may belong to a number of them simultaneously.
2. Diameter of any cluster $C_i$ is no greater than $d_0$.
3. Any subset of elements $\{a_{i1},a_{i2}, \ldots ,a_{iq}\}$ in the configuration A with diameter no greater than do is contained in some cluster $C_i$.
4. The system of clusters $\Gamma$ is minimal in the sense that there can be no two different clusters $C_i$ and $C_j$ such that $C_i \subset C_j$.

The following properties of super-partitions are easily derived from this definition.

Property 1. For any configuration of elements there exists a unique super-partition.

Property 2. Assume that we have two configurations of elements $A=\{a_1,a_2, \ldots ,a_k\}$ and $A'=\{a_1,a_2, \ldots ,a_k,a_{k+1}\}$ where A is a subset of A', and S' is the super-partition of A'. If we delete $a_{k+1}$ from all clusters of S', and also delete an empty cluster in S' if $a_{k+1}$ constituted a unit cluster there, we will have a super-partition S of configuration A.

Property 3. Let A and A' be as defined above, and S the super-partition of A. Then we can construct a super-partition S' for A' by the following method: append the element $a_{k+1}$ to all clusters $C_1$ in S for which $d(a_{k+1}, C_i) \leqq d_0$, and in case there are no such clusters, construct an additional unit cluster from element $a_{k+1}$.

These properties allow the construction of the following Initial Clustering Algorithm consisting of a series of steps.

The Initial Clustering Algorithm

Assume as before a configuration of n elements $a_1,a_2, \ldots ,a_n$ ordered by their IDs.

Step 1. Take element $a_1$ and construct a cluster $C_1=\{a_1\}$.

Step 2. Consider element $a_2$ and calculate the distance $d(a_2,C_1)$: if $d(a_2,C_1) \leqq d_0$, then include $a_2$ into $C_1$, otherwise construct a new unit cluster $C_2=\{a_2\}$.

General step m ($2 \leqq m \leqq n$). Assume that there have already been constructed p ($p \leqq m-1$) clusters $C_1,C_2, \ldots ,C_p$ containing the first m−1 elements in the configuration. Now, we have to allocate the next element $a_m$ to some of those clusters by calculating distances $d(a_m,C_1)$, $d(a_m,C_2), \ldots, d(a_m,C_p)$, and by appending the element $a_m$ to all those clusters for which the corresponding distance is no greater than $d_0$. In case there are no such clusters, we set up a new unit cluster $C_{p+1}=\{a_m\}$. We will denote by $\Gamma_0$ the super-partition obtained after termination of this algorithm.

It can be easily verified that The Initial Clustering Algorithm produces a super-partition of the original configuration. As noted earlier, solutions produced by this algorithm are likely to contain both type A and type B errors; those will be dealt with at steps 2 and 3 ahead.

Step 2: Sequential Splitting Procedure

As indicated above, a system of clusters obtained by the initial clustering procedure will usually contain many false clusters. At this step we will use the positions of cell phones observed at successive moments $t_1, \ldots ,t_s$ for sequentially splitting too stretched out clusters suspected to be false. This is usually possible due to the fact that distances between vehicles are constantly changing and, when observed over a succession of time moments, will almost inevitably allow the exposure of any false clusters initially created at Step 1.

The Sequential Split Algorithm

Consider the moment $t_1$. We have the system of clusters $\Gamma_0$ obtained at the moment $t_0$ but the distances between pairs of elements are different from those observed at moment $t_0$. Now, we go over all clusters in $\Gamma_0$, and recalculate the diameter for each cluster based on new distances. If cluster's new diameter is no larger than $d_0$, the cluster is retained intact, otherwise the Sequential Split Algorithm is applied to it, and, as a result, it is split into two or more clusters. After this process terminates, a new system of clusters, say, $\Gamma_1$, is obtained. At the moment $t_2$, this procedure is applied to $\Gamma_1$, resulting in a system $\Gamma_2$, etc. After completion of this step, the sequential split algorithm produces a new system of clusters, say, $\Gamma=\Gamma_s$. Note that under realistic traffic conditions, and with the assumption of an absence of large measurement errors, the obtained clusters are likely to closely emulate real clusters of cell phones in moving vehicles.

Step 3: Agglomeration Procedure

Until now we have been ignoring large measurement errors and the ensuing type B errors. Now, we will presume a small number of large measurement errors (for a more precise definition of 'small number' see below).

If at a moment $t_r$, some cell phone's position was measured with large error, it means that it was either:

1. Shot into empty space (and thereby made into a unit cluster), or
2. Tossed into a foreign cluster.

First consider the case when this happened at the initial moment $t_0$.

If a phone was shot into space, it will remain in a unit cluster until the end, and if tossed into another cluster, it will most probably be chipped away and put into a unit cluster at one of the following steps.

Furthermore, if this happened at one of the following moments rather than $t_0$, the phone will be made into a unit cluster anyway.

Therefore, it appears that to correct type B errors, it will suffice to go over all unit clusters and to check:

1. Whether the element in this unit cluster is also present in another non-unit cluster, and if yes, then to kill the unit cluster;
2. Whether it is possible to fuse it into another cluster.

The Kill-Unit-Clusters Algorithm

This algorithm attempts the elimination of unit clusters by searching for multiple entries. Assume that at moment $t_s$, we have non-unit clusters $C_1, C_2, \ldots, C_p$ and unit clusters $\{a_1\}$, $\{a_2\}, \ldots, \{a_q\}$. For each unit cluster $\{a_i\}$, check if $a_i \in C_j$ for at least one $C_j$, and if 'yes', then kill unit cluster $\{a_i\}$.

If the Kill-Unit-Clusters Algorithm terminates by removing all unit clusters, then stop, otherwise apply the Fusion Algorithm described below.

Before presenting the Fusion Algorithm we need some assumptions. Consider a unit cluster $\{a\}$ that might have been created as a result of a large measurement error: a cell phone a was dashed from its natural cluster and generated a false unit cluster. To be able to proceed, we are going to make the two following assumptions:

1. For each phone making a unit cluster, there might have been, at most, one large measurement error;
2. No large measurement errors have been made at the last moment $t_s$.

The Fusion Algorithm

Assume that at the last $t_s$, there exist non-unit clusters $C_1(s), C_2(s), \ldots, C_p(s)$ and unit clusters $\{a_1\}, \{a_2\}, \ldots, \{a_q\}$. We will consider unit clusters one by one and try to fuse them into other non-unit clusters. For the first unit cluster $\{a_1\}$, we will check conditions $$d(a_1, C_1(s)) \leqq d_0, d(a_1, C_2(s)) \leqq d_0, \text{ etc.}$$

Suppose it has been found such cluster $C_j(s)$ that $d(a_1, C_j(s)) \leqq d_0$ is fulfilled. For any $t = t_{s-1}, t_{s-2}, \ldots t_0$, denote by $C_j(t)$ a cluster or sub-cluster consisting of the elements in the cluster $C_j(s)$ at moment t. Now we check the system of conditions $$d(a_1, C_j(s-1)) \leqq d_0$$

$$d(a_1, C_j(s-2)) \leqq d_0$$

$$d(a_i, C_j(0)) \leqq d_0$$

If these conditions are all satisfied, except at most one (that may correspond to an outlier), we decide that $a_1$ belongs to cluster $C_j(s)$ and fuse $a_1$ into cluster $C_j(s)$ .

Similar operations are then performed on $a_2$, and all other unit clusters. If after completing all possible fusions, there remain one or no unit clusters, the procedure terminates.

Now assume that there remain more than one unit clusters. For all possible pairwise combinations of unit clusters $\{a_i\}$ and $\{a_j\}$, we attempt to perform pairwise adjustments (see definition and description below). Denoting adjusted elements by $a'_i$ and $a'_j$, we then set up a new non-unit cluster $C_{ij} = \{a'_i, a'_j\}$. Similar operations are performed on all unit clusters. At the end, either there remain no unit clusters, or the remaining unit clusters cannot be fused into other clusters and are thereby presumed to be real unit clusters representing single-phone vehicles.

Pairwise Adjustments of Unit Clusters of Cell Phones

Let two cell phones $a_1$ and $a_2$ have recorded positions $p = (p_1, p_2, p_3, p_4)$ and $q = (q_1, q_2, q_3, q_4)$ respectively over the observed time period of four time moments. If all the distances $d(p_i, q_i)$ are no larger than $d_0$, or, on the opposite, 3 or 4 of them are larger than $d_0$, no adjustment is performed. Adjustment may be necessary if only one or two of those distances are larger than $d_0$.

First consider the case when $d(p_2, q_2) > d_0$, all others being no larger than $d_0$.

If divergence of points $p_2$ and $q_2$ is due to an outlying position of one of the phones, we do not know of which. Therefore, we try to replace each of the suspected outlying positions $p_2$ and $q_2$ by interpolated positions $p'_2$ and $q'_2$ respectively. Interpolating cell phone positions is described below.

First, we check the condition $d(p'_2, q_2) \leqq d_0$. If it is true, we assume that $p_2$ was an outlying position, we replace it with the interpolated position $p'_2$, and proceed. Now the pair of phones $a_1$ (with $p_2$ replaced by $p'_2$) and $a_2$ may be deemed as belonging to a common cluster, and they are replaced by a non-unit cluster containing them both.

If the condition $d(p'_2, q_2) \leqq d_0$ does not hold, we check the condition $d(p_2, q'_2) \leqq d_0$, and proceed in a similar fashion. If not, we can try the condition $d(p'_2, q'_2) \leqq d_0$.

The case of $d(p_3, q_3) > d_0$ is completely similar.

Now consider the case of two large divergences: $d(p_2, q_2) > d_0$ and $d(p_3, q_3) > d_0$. First, we try to adjust the positions $p_2$ and $q_2$, and if successful, then adjustment for $p_3$ and $q_3$ is attempted. If both adjustments are successful, a new non-unit cluster is created; otherwise both unit clusters remain unchanged.

If endpoints $p_1$, $p_4$ are trouble-makers, no interpolation is performed, and the cell phones will be put on a pending list for possible future resolution of the problem.

Now we describe interpolating cell phone positions.

If two positions $p_1$ and $p_3$ are on the same section, simple linear interpolation in time will suffice. If $p_1$ and $p_3$ belong to adjacent sections, first a route connecting them is calculated, and thereafter linear interpolation in time is performed. If $p_1$ and $p_3$ are far away (a rare case), then linear interpolation is probably not safe and should not be attempted.

Note. It should be noted that rating of sibling CPs as sharing a common vehicle does not necessarily classify them in that manner permanently. In a future moment they may become separate as for instance an individual cell phone user traveling in a bus and changing to another bus later. When such a change occurs, a new travel path is created for each CP as described above. It is expected therefore, that most double or triple recordings of the multiple cell phones from common vehicles may be identified and clustered into common vehicles at an early stage to arrive at the correct number of recorded vehicles on each road section.

Representation of Vehicles by Vehicular Clusters

After all feasible vehicular clusters have been grouped together, each one is assigned a new vehicular identity AU1, AU2, etc. For the purposes of this invention, this new identity, say, AU1 will be considered representative of the cluster coordinates, speed, and movement directions (see FIG. 8), and will be called a 'vehicle' AU1.

All other individual CP cell phones not included in clusters but satisfying traveling profile characteristics and conditions as described above will also receive similar vehicular identities AUn and will be called unit clusters.

For the purposes of traffic load calculations for each road section, each AU entity will represent a vehicle, and coordinates of all clusters will be calculated as the averages of the corresponding coordinates of cell phones in the corresponding cluster.

Creating Travel Path Profile for Each Vehicle (Speed, Direction of Travel)

Each AU vehicle is associated with an appropriate road section (the road section it is ostensibly traveling on at a particular moment) and put on a current vehicle list CVL. It will be required that at least 4 AU positions be recorded at consecutive time intervals and stored on previous Vehicle Lists (pVL) similar to previous phone Lists. The CVL will be analyzed with respect to vehicle coordinates, and the vehicles assigned to appropriate road sections (see FIG. 10). The purpose of this analysis is to maintain a sequential path for each vehicle similar to the ppp paths of cell phones mentioned above. Each additional vehicle record is stored in the current list CVL and analyzed with respect to its previous positions, speed and directions. It is expected that new additional information together with previous recorded data will provide a plausible progression profile for each vehicle.

It should be noted that some continuity criteria for the validity of the Vehicle path profile will be applied as in the creation of cell phone profiles ppps above. Namely, for each vehicle, the vehicle path profile can only be constructed if the predetermined number of its lately recorded positions (say, 4 or 5) is available on the pVL and CVL lists.

However, there are differences as compared to the treatment of cell phones above. First, 'vehicles', i.e. vehicular clusters, are 'created' from groups of cell phones after the data on cell phones have been cleaned as described above so that most problems resulting from bad data do not arise here. Second, vehicles may contain sets of active cell phones rather than individual phones. FIG. 11 illustrates the criteria for placing cell phones into vehicular clusters and FIG. 12 illustrates groping cell phones into vehicular clusters.

Attaching Real Time Traffic Related Information to Road Sections

In order to define real time vehicle information on road sections, some assumptions must be made.

1. The vast majority of vehicles travelling on the roads are equipped with some kind of cellular phone device connected to network operators. It will be assumed that all cell phone data from these various operators will be available and will be processed in the Central Traffic Database.
2. We assume that vehicles without cell phones in major urban centers represent only a fraction of total vehicles traveling and this number will progressively decrease. Later we will describe the methodology of estimating the number of vehicles without cell phones and their influence on real vehicle traffic loads on urban roads.
3. In the event that the ratio of vehicles with cell phones to the total number of travelling vehicles approaches 90% to 100%, the data obtained in the framework of the present system can be considered truly representative traffic data. Naturally, in the event that this ratio is less favorable, the information obtained on the totality of vehicles will still be useful as statistical data but less reliable as real time traffic data. For example, these statistical data may be applied to general vehicle load patterns in various urban locations but less applicable for specific automated traffic signal controllers.

FIG. 13 illustrates placing vehicles on road sections. As shown in FIG. 13, in order to prepare statistical tables based on real time vehicle-related information for each AU on road sections, the CVL and PVL data are recorded according to the specific road sections. In addition, each road section RS contains real time data such as vehicle ID, recorded observation time t, and each vehicle position stored over a given period of time, say, $\Delta t=16$ min. The time $\Delta t$ is further subdivided into shorter observation time slots such as 2 minutes. These slots may correspond to the expected intervals between each vehicle consecutive positions on a corresponding road section on the Road Section List. Any vehicle whose position coordinates correspond to the given RS will be recorded on this RS according to its specific time slot. In this fashion, a full updated list of all presently recorded vehicles passing through the RS in At can be constructed. The total number of vehicles at each RS will represent current traffic load CTL on that particular RS. Entry and exit times (ENT) and (EXT) (first and last recorded positions for each vehicle AU) can also be calculated for each road section RS1. It should be noted here that time EXT can be obtained only after the vehicle AU was observed on the next consecutive, usually adjacent, road section, say, RS2 at a later time moment T6. (This is necessary in order to avoid the possibility that the AU is still located on the RS1 and waiting to turn to RS2).

The data structures associated with sections and used for computing the times ENT and EXT are as follows. Each such data structure related to a particular section RS consists of two lists of vehicles as shown in FIG. 14. The first list, Entry List (ENL), contains all the vehicles presently traveling on this section of the road identified by their together with their ENTs. The second list, EXL, represents a queue of the latest n vehicles (optionally, n is set equal to 3) that already left section RS. The database stores their IDs together with their ENTs and their EXTs. The two lists are updated as follows: When a vehicle enters section RS, it is put on ENL of RS together with its ENT. When a vehicle leaves RS, it is removed from ENL of RS and is put last on EXL of RS together with its ENT and EXT. Simultaneously, the first vehicle in the queue is removed from EXL of RS.

Every RS containing a new vehicle data can be updated automatically on a real time dynamic traffic flow map for each observed time $\Delta t$ within a given region. It is expected that for any $\Delta t$, each vehicle may be recorded on a number of RSs depending on the speed and direction of the traffic flow. All data that needs to be extracted for each RS such as RS loading, estimated vehicle travelling velocities, number of turning vehicles(as will be explained bellow), predicted intersection loads and directions etc., can be obtained for specific time slot or for the overall period $\Delta t$.

Maintaining Statistical Traffic Data Table

The Traffic Service Center monitors all traveling vehicles AU and registers their travel times, loads etc. on road sections as described above. Thus, we obtain empirical travel times along all sections, number of vehicles per section at interval $\Delta t$, travelling speed coefficient for that RS and other data which will be stored in the Traffic Service Center database. All sections will also contain other pertaining information such as type of road, day of the week, month in the year etc. These data will allow for seasonal changes between summer and winter etc.), various combinations of working days or holidays, holidays for students and school pupils, time of the day (see FIGS. 16 and 17).

It should be noted that real time observations for a great number of road sections might create system memory problems. For this reason, the concept of limited $\Delta t$ real time observation period was introduced to be used according the available system capacity. It is expected however, that a separate Statistical Traffic Data Table for each road section RS can also be constructed. This table will record all available traffic information for each individual RS such as number of vehicles, average vehicle speeds, directions etc. on hourly, daily or weekly etc. basis. This information can be used as a statistical supplement for the real time data or for developing overall regional traffic analysis.

Statistical Prediction of Travel Times on Road Sections

A still better way to account for variations of travel times due to changing traffic conditions is to use statistical prediction methods. A simple one is linear regression prediction.

Regression-Based prediction of Current Travel Times presented in FIG. 15 is performed as follows: Assume that the EXL contains n travel times $\Delta t1, \Delta t2, \ldots, \Delta tn$, while $t_1, t_2, \ldots, t_n$ are the corresponding entry times. Also assume that the entry times are ordered increasingly: $t_1<t_2<\ldots<t_n$. Then computing a linear regression of the travel times $\Delta t_1, \Delta t_2, \ldots, \Delta t_n$ on the entry times $t_1, t_2, \ldots, t_n$, we can predict a future travel time as a predicted value of $\Delta t$ at time moment t. Predicted future travel time values will then be utilized by traffic controllers in adjusting the traffic flow according to the computed linear regression estimates in subsequent time intervals. We assume that by using regression curves a better approximation of the future traffic loads and their distribution can be achieved. Similarly, these predicted values could also be used in traffic navigation systems and in future traffic loads prediction tables.

Preparing True Vehicle Loads for All Road Sections (Adjusting for Vehicles Without Cell Phones)

Estimating real vehicle load for each road section and intersection is an essential element of all traffic light control applications. Besides other factors, it is required to obtain the true quantity of vehicles located on particular road sections at a given time. For the purposes of this invention, vehicles without cell phones must also be taken into account in traffic load calculations. Estimation of the overall number of those vehicles can be accomplished in several ways the main of which are listed below.

A. By utilizing public poll statistical data on population of cell phone owners. In the traffic areas where no other information exists with regard to numbers of vehicles without cell phones, it may be possible, through various information polls and specific questionnaires, to determine number of cell phone users in cars in specific geographical regions on daily basis. This may provide a general picture of usage of cell phones by drivers for certain destinations but still may not truly estimate existing vehicle loads on all road sections at a given time as they may vary from place to place and from one time of the day to another.

B. By using detailed existing statistical traffic load data for various municipal traffic study areas. In many urban areas traffic authorities constantly update the existing estimates of traffic loads for specific key zones in order to establish available parking spaces, high peak time periods, peak traffic congestion periods, etc. As these data are constantly updated, it may be advantageous to use the current vehicle data and the corresponding cell phone data to establish a usable statistical ratio R (the number of cell phones in vehicles to the total number of vehicles) to be used in RS load calculations.

C. By determining a reliable ratio R of vehicles equipped with cell phones to the total number of vehicles by comparing two methods of counting vehicles wherever possible. In any large city there are roads and signal intersections equipped with detectors, ramp meters, and similar devices for counting passing cars. If their outputs are available to our system, they can be used for estimating the ratio R introduced above. If at a specific road section at a particular moment, $k_1$ cell phones have been identified by our system and simultaneously $n_1$ vehicles have been registered by road detectors, the estimate for R may be calculated as $\hat{R}_1=k_1/n_1$. Assuming at another road section without vehicle counters, k cell phones have been identified by our system, we can estimate the number of vehicles located there as $\hat{n}=k/\hat{R}_1$. Of course, we can calculate an estimate for R averaged over a number of sections with detectors, etc. It appears that this method could provide closer estimates because they are obtained from nearby regions at the same time and therefore reflect similar traffic situations.

It may also be advantageous to introduce another control parameter in a system of determining the traffic volume on each individual road section RS. Statistical estimates of quantities of vehicles obtained via the R ratio should also be compared to the historical statistical data if available. The final vehicle estimate $\hat{N}$ will then be established by the following rule:

$$\hat{N}=\hat{n} \text{ if } \hat{n}>n_{hist}, \text{ otherwise } \hat{N}=n_{hist}$$

where, $\hat{n}$ is the estimate obtained via $\hat{R}$, and $n_{hist}$ the historical estimate.

It is expected that by comparing the obtained data with the historical results any gross discrepancies can be eliminated.

Updating Data for Various Traffic Optimization Programs, Automated Actuated Traffic Signal Controllers, And Various Travel Navigation Systems As described above in the main body of the specification, the exemplary embodiment of the present invention provides a method for computing the following information:

- real time traffic load data for road sections;
- automatic calculation of current travel times for road sections;
- vehicle flow directions;
- statistical updates of the above; and
- short-term predictions of the above.

All this information can be utilized by various traffic optimization programs and automated actuated traffic signal controllers for specific computations in their own traffic optimization models.

Traffic signal models calculate cycle length, signal phases, phase splits, offsets, etc. They provide simple or two-phase plans, or can be tailored to allow heavy traffic phasing. Many signal intersections also allow for left turning phase, opposing traffic phase, lead phase etc.

Both master and single actuated traffic signal controllers such as NEMA local controllers are used at many locations for signal intersection control. Their control operation requires phasing and timing of traffic signal data, traffic turn movement counts, traffic turns movement percentages, and traffic volumes that can be provided by the system described in the specification.

Within the scope of this patent we assume that our communication network can also transmit real time data updates to other client application programs such as guided navigation systems, traffic related and congestion studies, emergency 911 services, etc. These services can be provided independently from our traffic center database server via Internet and WAP applications.

Methods for obtaining some more specific traffic data will be further described in the following patent Refinements and Future Embodiments section.

Patent Refinements and Future Embodiments

This section describes a number of possible improvements of the exemplary embodiment of the present invention in the form of additional embodiments that may be implemented either instead of the first exemplary embodiment or added as refinements at later stages of implementation. It should be kept in mind, however, that possible extensions to the present invention are by no means limited to the embodiments described below.

Future Embodiment

The purpose of this embodiment is to provide additional examples of the kinds of traffic data that can be also obtained and computed on the basis of the information-gathering model developed in the present invention. The examples presented here include among others traffic turn movement counts, traffic turns movement percentages, left and right turns, traffic loads at each road intersection, and road saturation percentages. Turning-vehicle volumes for each intersection node INT may be defined as the total number of completed vehicle turns: (i.e. sum of left turns, right turns and straight pass-throughs for a given time T) for that node. The vehicle turns will be further expressed in terms of RT and LT turn movement percentages and turn preference values. We give here a brief description of a method of turn movement counts of vehicles located near road intersections and adjacent road sections.

We start by creating a Current And Daily Turning-Vehicle Table for Road Intersections (see FIG. 18). This table stores total number of vehicles which have completed left and right-turns, straight pass-throughs (no-turn) at a given time interval (say 2–15 min.) at road intersection nodes INT1, INT2, . . . All intersections in this table are grouped together according to specific geographical regions and with an updated list of turning options allowed for a given location. Another table, Current And Daily Vehicle Traffic Loads Table for Road Sections (see FIG. 19), will be created for each road section RS. It contains total number of vehicles that have traveled on this RS, or traffic loads for that RS in the period T. It will also contain current turning data and turning options at a given RS.

The turning computations are executed in the following manner: The position P (x, y) of each vehicular cluster AU travelling on a road section RS is recorded at time T as shown in FIG. 20. In this example, vehicle AU33 is first recorded at time T1 in position p1 (x1, y1). After applying the positioning Algorithm described above, AU33 is positioned on the corresponding road section i.e. on RS4, then at time T2 on RS12, at T3 on RS13, etc. When the vehicle AU33 has left RS4 and is next recorded on RS12 at time interval T1–T2 it is considered to have "cleared" INT1 intersection node and is recorded in the intersection table at INT1. If the AU cannot be found on any adjacent RS, it will be assumed no turn was executed yet.

Vehicle loads, traffic loads and road saturation percentages for each INT will be computed at a given time T as the sum total all of vehicles N that have "cleared" the adjacent INT and are observed traveling on another RS. All turns, right-turns, left-turns, and straight pass-throughs are also computed for that appropriate RS and the results updated in current and statistical tables. We expect, that the turn volume data and movement percentages obtained in this embodiment together with timing and phasing data provided by the traffic controller will supply sufficient real time data necessary for planning of actuated traffic signal controllers.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A method of acquiring information from a cellular network provider having a plurality of cell phones for use within a regional roadway system having a plurality of road sections, the method comprising the steps of:

(a) obtaining data within a predetermined real time frame based on a respective position of each of the plurality of cell phones in the regional roadway system;

(b) assigning a respective identifier to each of the plurality of cell phones, the identifier being unrelated to the plurality of cell phones;

(c) storing the identifiers in a database together with the corresponding recorded signal times and position coordinates;

(d) determining whether each cell phone is located in a moving vehicle; and (e) creating a list of all cell phones currently identified as located in moving vehicles based on the determining step (d).

2. The method according to claim 1, for use with a Traffic Service Center, the method further comprising the steps of:

(f) compiling and updating a profile in the Traffic Service Center for a sequence of real time positions of each cell phone located in the moving vehicle;

(g) positioning each cell phone located in the moving vehicle onto a corresponding road section of the regional roadway system according to the position coordinates of the cell phone relative to that road section and also to further road sections;

(h) eliminating untenable cell phone positions by analyzing a series of recorded positions and correlating them with the further road sections; and (i) making imputations for missing cell phone positions by analyzing the series of recorded positions and correlating them with the further road sections.

3. The method according to claim 2, further comprising the steps of:

(j) calculating a respective path for each of the plurality of cell phones determined in step (d) to be located in a moving vehicle;

(k) determining a respective direction of movement of each one of the plurality of cell phones based on the calculation of step (j); and (l) estimating average traveling velocities of all cell phones.

4. The method according to claim 2, wherein step (g) is based on an analysis of previous cell phone positions within the plurality of road sections.

5. The method according to claim 1, further comprising the steps of:

(f) calculating a respective path for each of the plurality of cell phones determined in step (d) located in a moving vehicle;

(g) determining a respective direction of movement of each of the plurality of cell phones determined in step (d) located in a moving vehicle; and (h) estimating a respective average traveling velocity of each of the plurality of cell phones determined in step (d) located in a moving vehicle.

6. The method according to claim 1, further comprising the steps of:

(f) determining if multiple cell phones of the plurality of cell phones are within a common vehicle based on at least one of i) a respective position and ii) a respective direction of travel of each of the multiple cell phones;

(g) combining the multiple cell phones into a single vehicular cluster of a plurality of vehicle clusters based on the determining step (f);

(h) calculating a respective position for each vehicular cluster of the plurality of vehicle clusters based on respective positions of the cell phones located within a respective vehicle cluster;

(i) calculating a continuous path for each one of the plurality of vehicular clusters;

(j) determining a respective direction of movement for each vehicle cluster based on the calculations of step (i);

(k) estimating a respective average velocity of each vehicle cluster; and (l) storing the respective position for each vehicle cluster in a database.

7. The method according to claim 1, further comprising the steps of:

(f) maintaining and updating for each road section the list of vehicles presently moving on it;

(g) maintaining and updating for each road section the list of vehicles that exited it within a predetermined time period; (h) maintaining and updating for each road section an estimate of current average travel time for that section;

(i) estimating and updating the current status of the traffic and the traffic flow at each road section; and (j) estimating turning movements and turing proportions of vehicles on the plurality of road sections and on adjacent road intersections.

8. The method according to claim 7, further comprising the step of:

(k) estimating a ratio of vehicles with cell phones to a total number of vehicles travelling within a predetermined region of the regional roadway system.

9. The method according to claim 1 for use with a Traffic Service Center, the method further comprising the steps of:

(f) acquiring further information for the plurality of road sections from at least one further acquisition system;

(g) correlating the information with the further information acquired in step (f);

(h) estimating traffic flow based on the correlation in step (g);

(i) providing a real time interactive communication between at least one of i) the Traffic Service Center and ii) at least one Automatic Traffic Signal Control System; and (j) distributing the traffic flow information obtained in step (h) to at least one Automatic Traffic Signal Controller and to at least one Automatic Traffic Signal Control System.

10. The method according to claim 1 for use with a Traffic Service Center, the method further comprising the steps of:

(f) collecting, processing and storing real time road traffic data for the plurality of road sections within a predetermined geographical region;

(g) collecting, processing and storing respective further real time road traffic data for at least one further geographical region;

(h) updating a database of the Traffic Service Center in real time based on the collecting steps (f) and (g); and (i) communicating with at least one of a vehicle based navigation system and an Internet based traffic information service.

11. The method according to claim 1, wherein the regional roadway system includes a plurality of intersections, the method further comprising the steps of:

(f) processing historical statistical traffic data for the plurality of road sections and the plurality of intersections based on a predetermined time interval; and (g) compiling a first prediction and a second prediction of traffic volumes and travel times for all road sections and intersections based on the processing step (f), wherein the first prediction is for a first time period and the second prediction is for a second time period greater that the first time period and is based on a different method.

12. The method according to claim 1, wherein the data in step (a) is obtained one of i) continuously and ii) at a predetermined time interval.

13. The method according to claim 1, wherein the determining step (d) is based on at least one of i) a calculated velocity of the cell phone being within a predetermined range of values and ii) a position of the cell phone being a position relative to the regional roadway system.

14. A method for acquiring traffic information from a plurality of vehicles traveling along a section of a roadway for use with a wireless telephone network, the method comprising the steps of:

(a) obtaining respective position data of a plurality of telephones communicating with the wireless telephone network;

(b) determining if multiple cell phones of the plurality of cell phones are within a common vehicle based on at least one of i) a respective position and ii) a respective direction of travel of each of the multiple cell phones;

(c) combining the multiple cell phones into a single vehicular cluster of a plurality of vehicle clusters based on the determining step (b);

(d) generating a path profile for each of the plurality of vehicles; and (e) calculating a traffic load based on the path profiles generated instep (d).

15. The method according to claim 14 for use with a traffic control system, the method further comprising the step of:

(f) providing the traffic load calculated in step (e) to the traffic control system.

16. The method according to claim 14, wherein the section of roadway includes at least one intersection, the method further comprising the step of:

(f) calculating traffic volumes at all intersections.

17. The method according to claim 14 further comprising the steps of:

(f) calculating predictions of travel times for all sections of the roadway.

18. The method according to claim 14 further comprising the steps of:

(f) determining if more than one telephone is located within a single vehicle of the plurality of vehicles; and (g) creating a single record of position data based on the determining step (g).

19. The method according to claim 14, wherein the position data is only obtained for telephones which are activated.

20. The method according to claim 14, wherein the data for each of the plurality of telephones is obtained from a provider of the wireless telephone network.

21. A method for determining a vehicular traffic load along a section of a roadway within a region for use with a wireless telephone network having a plurality of wireless telephones, the method comprising the steps of:

(a) obtaining a record for each of the plurality of wireless telephones within the region from the telephone network;

(b) determining if each telephone of the plurality of wireless telephones is within a moving vehicle;

(c) deleting a respective record for each wireless telephone determined to be stationary based on step (b);

(d) determining if multiple cell phones of the plurality of cell phones are within a common vehicle based on at least one of i) a respective position and ii) a respective direction of travel of each of the multiple cell phones;

(e) combining the multiple cell phones into a single vehicle cluster of a plurality of vehicle clusters based on the determining step (d);

(f) creating a path profile for each vehicle cluster based on determining step (e); and (g) calculating the vehicular traffic load based on the path profiles created in step (f).

22. The method according to claim 21, wherein step (c) further comprises the steps of:

(h) determining if any wireless telephone having a record obtained in step (a) is outside the section of the roadway and can not be put on that section; and (i) deleting a respective record for each wireless telephone determined to be outside the section of the roadway based on step (h).

23. The method according to claim 21, wherein the record provided by the telephone network in step (a) includes at least a respective position data of each wireless telephone within the region.

24. The method according to claim 21, wherein each wireless telephone is assigned a unique identifier not related to an actual phone number.

* * * * *